US009176673B2

(12) United States Patent
Watanabe

(10) Patent No.: US 9,176,673 B2
(45) Date of Patent: Nov. 3, 2015

(54) MEMORY DEVICE

(71) Applicant: KABUSHIKI KAISHA TOSHIBA, Minato-ku (JP)

(72) Inventor: Konosuke Watanabe, Kanagawa (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 163 days.

(21) Appl. No.: 14/014,924

(22) Filed: Aug. 30, 2013

(65) Prior Publication Data

US 2014/0244907 A1 Aug. 28, 2014

Related U.S. Application Data

(60) Provisional application No. 61/770,043, filed on Feb. 27, 2013.

(51) Int. Cl.
*G06F 12/00* (2006.01)
*G06F 3/06* (2006.01)
*G06F 13/00* (2006.01)

(52) U.S. Cl.
CPC ............ *G06F 3/0613* (2013.01); *G06F 3/0659* (2013.01); *G06F 3/0679* (2013.01)

(58) Field of Classification Search
CPC ...... G06F 12/0246; G06F 12/00; G06F 13/00
USPC ....................................... 710/5; 711/103, 117
See application file for complete search history.

(56) References Cited

U.S. PATENT DOCUMENTS 5,363,488 A * 11/1994 Hidaka et al. ..................... 710/5
7,587,554 B2 9/2009 Deng et al.
7,908,424 B2 3/2011 Shikata et al.
2005/0086421 A1 4/2005 Nassar
2013/0036339 A1* 2/2013 Shiraishi ....................... 714/763
2013/0073793 A1* 3/2013 Yamagishi et al. ........... 711/103
2013/0073795 A1* 3/2013 Hasegawa ..................... 711/103
2014/0006690 A1* 1/2014 Shin et al. ..................... 711/103
2014/0244907 A1* 8/2014 Watanabe ..................... 711/103

FOREIGN PATENT DOCUMENTS

JP 2006-500663 A 1/2006
JP 4294894 B2 4/2009

(Continued)

OTHER PUBLICATIONS

International Search Report issued Sep. 17, 2007 in PCT/US2006/061416.

(Continued)

*Primary Examiner* — Christopher Shin
(74) *Attorney, Agent, or Firm* — Oblon, McClelland, Maier & Neustadt, L.L.P.

(57) ABSTRACT

According to an embodiment of the invention, a memory device includes an interface unit, a determining unit, a second command generating unit, and a processor. The interface unit receives a first command from the outside of the memory device. The determining unit determines whether the first command received by the interface unit is an access command that is a write command or a read command. When the determining unit determines that the first command is the access command, the second command generating unit extracts access destination information, which is address information or size information of an access destination, from the first command and generates a second command which includes the extracted access destination information and has a size less than that of the first command. The processor executes the second command.

24 Claims, 25 Drawing Sheets

(56) References Cited

FOREIGN PATENT DOCUMENTS

| | | | |
|---|---|---|---|
| JP | 2009-518759 | A | 5/2009 |
| JP | 2013-77278 | A | 4/2013 |
| TW | 201232259 | A | 8/2012 |
| WO | WO 2007/076214 | A3 | 7/2007 |

OTHER PUBLICATIONS

Taiwanese Office Action dated May 14, 2015, issued in Taiwanese Patent Application No. 102129355 (with English translation).

* cited by examiner

| COMMAND UPIU | | | |
|---|---|---|---|
| 0<br>xx00 0001b | 1<br>Flags | 2<br>LUN | 3<br>Task Tag |
| 4<br>Reserved \| Command Set Type | 5<br>Reserved | 6<br>Reserved | 7<br>Reserved |
| 8<br>Total EHS Length (00h) | 9<br>Reserved | 10 (MSB)<br>Data Segment Length | 11 (LSB) |
| 12 (MSB)<br>Expected Data Transfer Length | 13 | 14 | 15 (LSB) |
| 16<br>CDB[0] | 17<br>CDB[1] | 18<br>CDB[2] | 19<br>CDB[3] |
| 20<br>CDB[4] | 21<br>CDB[5] | 22<br>CDB[6] | 23<br>CDB[7] |
| 24<br>CDB[8] | 25<br>CDB[9] | 26<br>CDB[10] | 27<br>CDB[11] |
| 28<br>CDB[12] | 29<br>CDB[13] | 30<br>CDB[14] | 31<br>CDB[15] |

FIG.14

| RESPONSE UPIU | | | |
|---|---|---|---|
| 0<br>xx00 0001b | 1<br>Flags | 2<br>LUN | 3<br>Task Tag |
| 4<br>Reserved \| Command Set Type | 5<br>Reserved | 6<br>Response | 7<br>Status |
| 8<br>Total EHS Length (00h) | 9<br>Device Information | 10 (MSB)<br>Data Segment Length | 11 (LSB) |
| 12 (MSB)<br>Residual Transfer Count | 13 | 14 | 15 (LSB) |
| 16<br>Reserved | 17 | 18 | 19 |
| 20<br>Reserved | 21 | 22 | 23 |
| 24<br>Reserved | 25 | 26 | 27 |
| 28<br>Reserved | 29 | 30 | 31 |

MEMORY DEVICE

CROSS-REFERENCE TO RELATED APPLICATIONS

This application is based upon and claims the benefit of priority from U.S. Provisional Patent Application No. 61/740,043, filed on Feb. 27, 2013; the entire contents of which are incorporated herein by reference.

FIELD

Embodiments described herein relate generally to a memory device.

BACKGROUND

A UFS (Universal Flash Storage) standard has been developed in order to improve throughput and reduce power consumption.

BRIEF DESCRIPTION OF THE DRAWINGS

FIG. 14 is a diagram illustrating the structure of Response UPIU;

DETAILED DESCRIPTION

In general, according to one embodiment, a memory device that is connected to a host device, receives a command from the host device, and performs a process based on the command includes an interface unit, a determining unit, a second command generating unit, and a processor. The interface unit receives a first command from the outside of the memory device. The determining unit determines whether the first command received by the interface unit is an access command that is a write command or a read command. When the determining unit determines that the first command is the access command, the second command generating unit extracts access destination information, which is address information or size information of an access destination, from the first command and generates a second command which includes the extracted access destination information and has a size less than that of the first command. The processor executes the second command.

Exemplary embodiments of the memory device will be explained below in detail with reference to the accompanying drawings. The present invention is not limited to the following embodiments.

First Embodiment

Figures 1, 2:
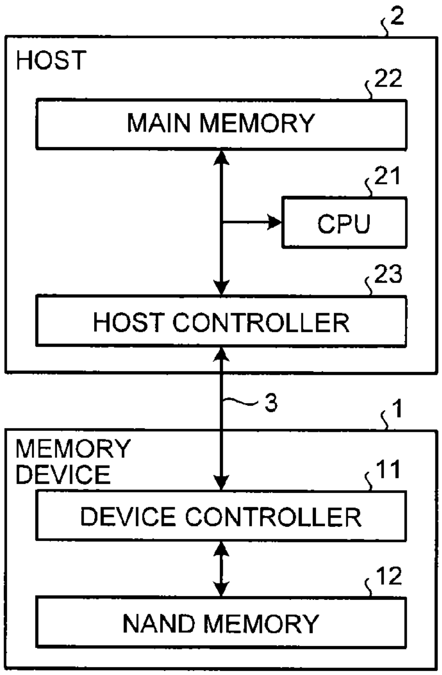
FIG. 1 is a schematic diagram illustrating a system to which a UFS standard is applied.
FIG. 2 is a diagram illustrating the structure of Command UPIU including an SCSI command.

FIG. 1 is a schematic diagram illustrating a system to which a UFS standard is applied. A memory device 1 is connected to a host 2 through a communication path 3. The host 2 is, for example, a personal computer, a mobile phone, or an imaging apparatus. The memory device 1 functions as an external storage device of the host 2. For example, MIPI (Mobile Industry Processor Interface) M-PHY is used as the communication standard of the communication path 3. Packets based on the UFS standard are transmitted and received between the host 2 and the memory device 1 through the communication path 3.

The memory device 1 includes a device controller 11 and a NAND flash memory (NAND memory) 12. It is also possible to use different kind of memory, such as MRAM (magnetoresistive random access memory) or ReRAM (resistance random access memory) in the replacement of the NAND flash memory 12. The NAND memory 12 includes one or more memory chips each having a memory cell array. The memory cell array is formed by arranging a plurality of memory cells in a matrix. Each memory cell array is formed by arranging a plurality of blocks each of which is a unit of data erasure. Each block includes a plurality of pages. The page is a minimum unit of reading and writing. The device controller 11 can transmit data between the host 2 and the NAND memory 12.

The host 2 includes a CPU 21, a main memory 22, and a host controller 23. The main memory 22 is, for example, a high-speed volatile memory such as a RAM. The CPU 21 controls the overall operation of the host 2. The CPU 21 controls the transmission or reception of packets through the communication path 3 as an example of the control of the host 2. For example, the CPU 21 can store data to be written from the host 2 to the memory device 1 in the main memory 22 and issue a write command to write the data stored in the main memory 22 to the memory device 1. In addition, the CPU 21 can issue a read command to read the data written to the memory device 1 to the main memory 22. The write command and the read command are transmitted to the memory device 1 through the host controller 23. The host controller 23 transmits the data stored in the main memory 22 to the memory device 1 or stores the data transmitted from the memory device 1 in the main memory 22. The write command, the read command, and the data are transmitted and received as the packets based on the UFS standard between the host 2 and the memory device 1.

Next, the system of the packet based on the UFS standard will be described. The packet based on the UFS standard is referred to as UPIU. The UPIU includes a 32-byte header. Examples of the header of the UPIU include Command UPIU, Data In UPIU (first response packet), Ready To Transfer UPIU (third response packet), Data Out UPIU, and Response UPIU (second response packet). A payload follows the header, if necessary.

Command UPIU is used to request reading and writing. Command UPIU includes an SCSI command. The SCSI command in Command UPIU defines whether Command UPIU requests reading or writing and defines detailed information for specifying an access destination. The SCSI command in Command UPIU is not limited to read and write request commands. In addition, Command UPIU may not include the SCSI command, but include unique commands.

FIG. 2 is a diagram illustrating the structure of Command UPIU including the SCSI command. In FIG. 2, each field in one row has a size of one word. It is assumed that one word is 32 bits. The field in one row is divided into four fields each having a size of 8 bits. A number on the upper left of each of the divided field is a field number. When Command UPIU is used for reading and writing, the lower 6 bits "000001" are stored as a value indicating that UPIU is Command UPIU in field 0. A value "0" indicating that UPIU includes an SCSI command set is stored in the second-half 4 bits (Command Set Type) of field 4. The SCSI command is stored in field 16 to field 31. In some cases, the first field (field 16) of the SCSI command is represented by CDB[0].

The type of SCSI command including the read command and the write command can be identified by a value (command type information) which is stored in CDB[0] in the SCSI command. In addition, there are three types of read commands and three types of write commands and each type can be identified by the value stored in CDB[0]. Specifically, when UPIU is a read command, a value corresponding to the type of read command among "0x08", "0x28", and "0x88" is stored in CDB[0] of UPIU. When UPIU is a write command, a value corresponding to the type of write command among "0x0a", "0x2a", and "0x8a" is stored in CDB[0] of UPIU. The read command is configured such that the address information and size information (Transfer Length) of an access destination are stored in any one of field 17 to field 31. However, the storage position of the address information and size information of the access destination varies depending on the type of read command, which holds for the write command. The address information of the access destination is designated by a logical block address (LBA). Hereinafter, the address information and the size information, which are information for specifying an area in which data for the access destination is stored, is, in some cases, referred to as access destination information. In addition, the access destination information may be the address information or the size information.

A flag indicating whether Command UPIU causes a reading operation or a writing operation may be stored in a predetermined area among field 0 to field 15 of Command UPIU. Command UPIU needs to be constructed such that information about the flag is consistent with the value stored in CDB[0].

As such, Command UPIU has a size of 32 bytes. The read command and the write command in Command UPIU include the access destination information in a field of the 32-byte Command UPIU. Command UPIU including the read command and the write command includes a reserved field and a field which is defined by the SCSI standard and is not needed in communication based on the UFS standard. In addition, the read command and the write command include command type information in fixed field 16. The access destination information is included in a different field for each command type information item.

Data is divided into data items each having a predetermined size and the divided data items are transmitted. Data In UPIU is issued by the memory device 1 when the divided data is transmitted from the memory device 1 to the host 2. Ready To Transfer UPIU is issued by the memory device 1 whenever the divided data is ready to be received. Data Out UPIU is issued by the host 2 when the divided data is transmitted from the host 2 to the memory device 1. The divided data is transmitted as the payload of Data In UPIU or Data Out UPIU through the communication path 3. Response UPIU is issued by the memory device 1 when the execution of the process requested by Command UPIU is completed. That is, when the process requested by Command UPIU is completed, the memory device 1 transmits Response UPIU corresponding to Command UPIU.

Figure 3:
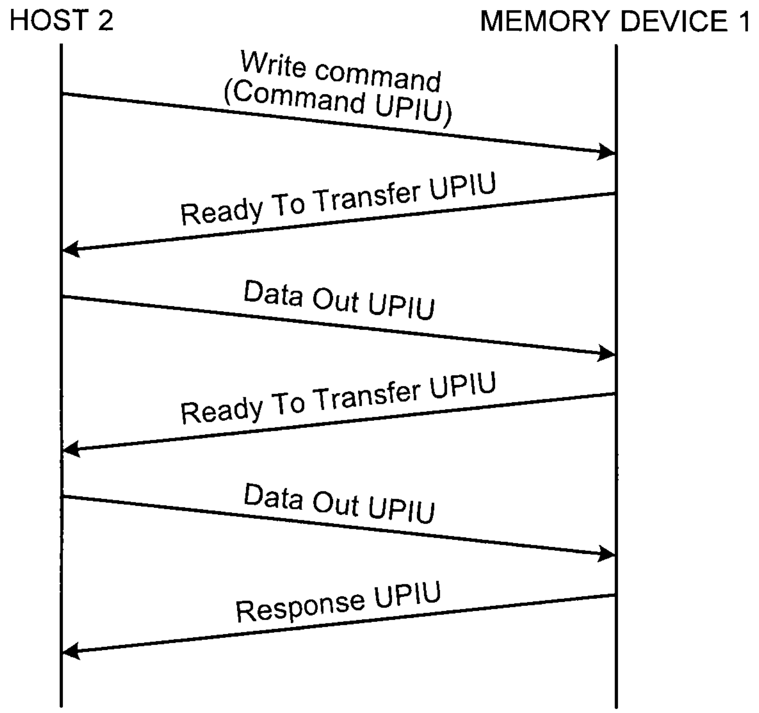
FIG. 3 is a timing chart illustrating a communication process during writing.

FIG. 3 is a timing chart illustrating a communication process during a writing operation. First, the host 2 transmits a write command with a Command UPIU format to the memory device 1. The write command includes the LBA and data length of the access destination in the field corresponding to the type of write command. When data is ready to be received, the memory device 1 transmits Ready To Transfer UPIU indicating the size of data which can be received to the host 2. Then, the host 2 divides data to be written into data items which have designated size and transmits the first data item among the divided data items to the memory device 1 using Data Out UPIU as a header. The transmission and reception of Ready To Transfer UPIU and the divided data items are repeated until the transmission of all data to be written is completed. The size designated by Ready To Transfer UPIU may be different for each Ready To Transfer UPIU. When receiving all data to be written, the memory device 1 transmits Response UPIU to the host 2.

Figure 4:
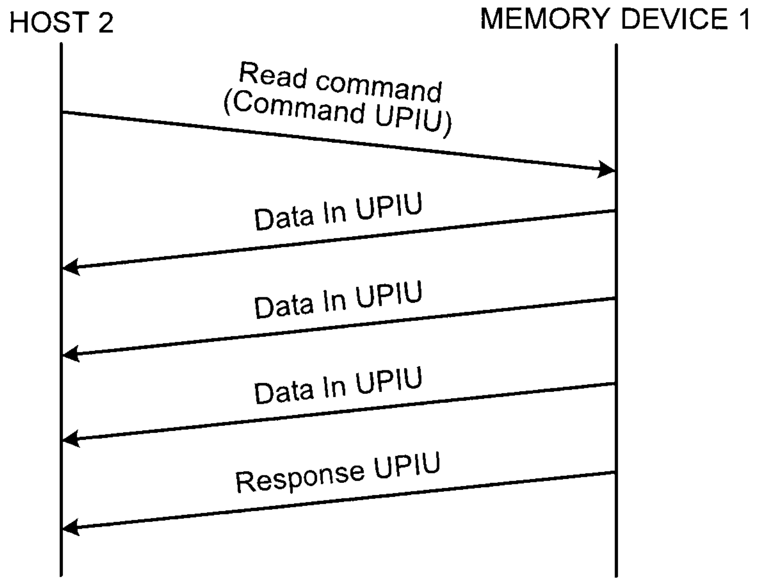
FIG. 4 is a timing chart illustrating a communication process during reading.

FIG. 4 is a timing chart illustrating a communication process during a reading operation. First, the host 2 transmits a read command with a Command UPIU format to the memory device 1. The read command includes the LBA and data length of the access destination in the field corresponding to the type of read command. When data is ready to be transmitted, the memory device 1 sequentially transmits divided data items, each having a size which can be transmitted, to the host 2 using Data In UPIU as a header. When all of the divided data items are transmitted to the host 2, the memory device 1 transmits Response UPIU to the host 2.

Hereinafter, the read command and the write command are generically referred to as a NAND access command. In addition, in some cases, the reading and writing operations for the NAND memory 12 are generically referred to as NAND access.

In general, in the device controller 11 of the memory device 1 based on the UFS standard (or a protocol similar to the UFS standard), communication with an external apparatus, such as the host 2, is processed by hardware and firmware. For example, when hardware receives UPIU from the host 2, the device controller 11 calls firmware using interrupt. Then, the called firmware reads unprocessed UPIU from a receiving buffer (reception queue). Then, the firmware analyzes the read unprocessed UPIU, checks errors in the read unprocessed UPIU, and starts a process corresponding to the content of UPIU.

As described above, in the NAND access command, the density of information required to perform the process is low. Therefore, when the firmware directly reads or writes the command, unnecessary data transmission is performed between firmware and hardware. In general, firmware is executed by a low processing performance CPU. Therefore, when the host 2 issues a large amount of UPIU to the memory device, CPU takes long time to process the received UPIU.

According to this embodiment of the invention, in the memory device 1, when the NAND access command is received, hardware extracts information required for NAND access from Command UPIU and reconstructs the extracted information such that it can be acquired by a minimum number of accesses. Since the size of the command which is read from hardware by firmware is reduced, it is possible to considerably reduce the processing time of firmware. As a result, it is possible to improve the access performance of the memory device 1.

Figure 5:
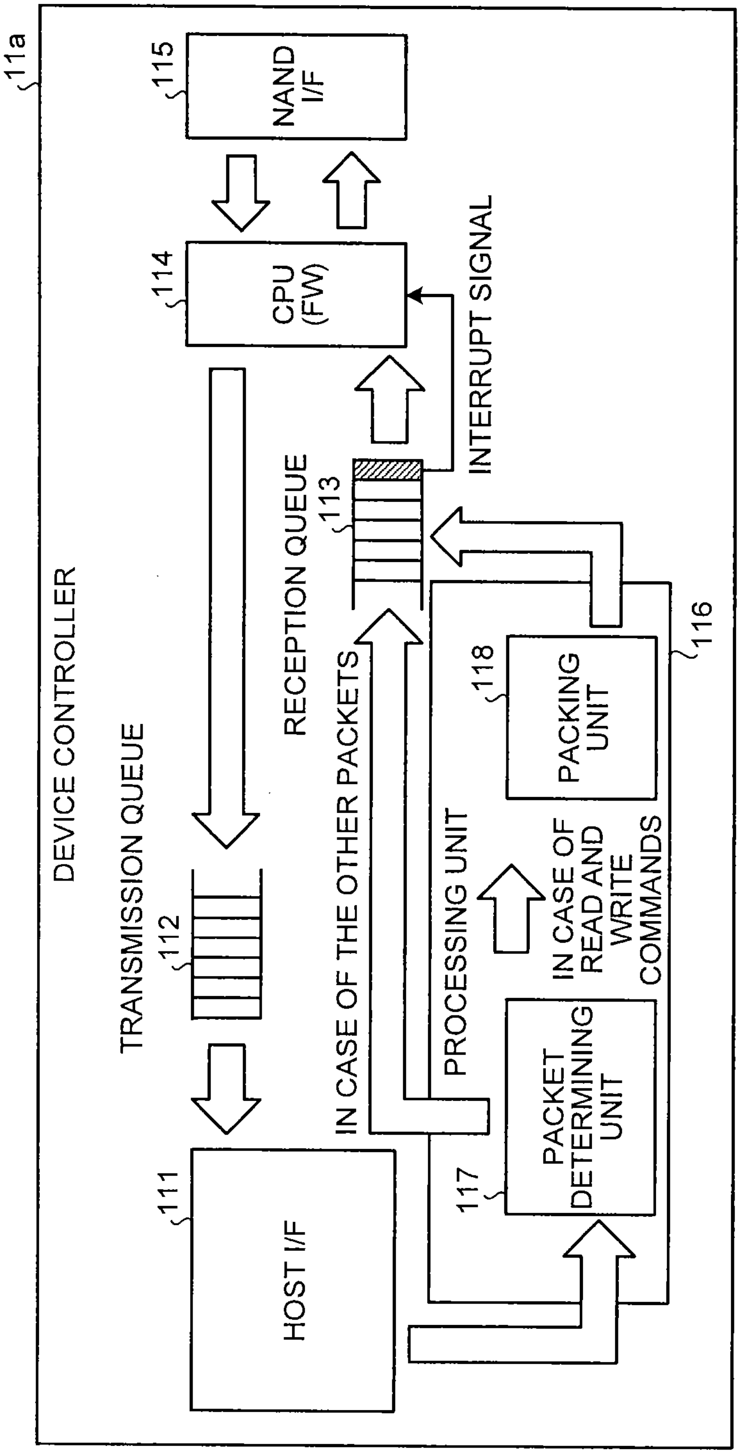
FIG. 5 is a diagram illustrating the structure of a device controller of a memory device according to a first embodiment.

FIG. 5 is a diagram illustrating the structure of the device controller provided in the memory device according to a first embodiment. In the following first to sixth embodiments, a memory device is represented by reference numeral 1. That is, the NAND memory 12 and a device controller 11*a* according to the first embodiment form the memory device 1 according to the first embodiment.

The device controller 11*a* includes a host interface (host I/F) 111, a transmission queue 112, a reception queue 113, a CPU 114, a NAND interface (NAND I/F) 115, and a processing unit 116. The processing unit 116 includes a packet determining unit (determining unit) 117 and a packing unit (second command generating unit) 118. The processing unit 116 is implemented by a hardware circuit.

The host I/F 111 is a hardware circuit for connecting the device controller 11*a* to the host 2 through the communication path 3. The host I/F 111 can receive packets from the host 2. In addition, the NAND I/F 115 is a hardware circuit for connecting the device controller 11*a* to the NAND memory 12.

The packet determining unit 117 transmits the NAND access command among the packets received from the host 2 by the host I/F 111 to the packing unit 118 and stores packets other than the NAND access command in the reception queue 113. The value in field 0, the values of the second-half 4 bits of field 4, and the value of CDB[0] in the format of Command UPIU are compared with a predetermined bit pattern to determine whether the packet is the NAND access command. Specifically, when the lower 6 bits "000001" are stored in field 0, "0" is stored in the second-half 4 bits of field 4, and any of "0x08", "0x28", "0x88", "0x0a", "0x2a", and "0x8a" is stored in CDB[0], the packet corresponds to the NAND access command.

The packing unit 118 extracts necessary information from the transmitted NAND access command and rearranges the extracted information in a predetermined compact format to reconstruct the command. Hereinafter, in some cases, the reconstruction of the command is referred to as a packing process. The packing unit 118 stores the packed command in the reception queue 113. For example, the format of the command (second command) reconstructed by the packing process includes two formats, that is, a short format (third command) and a long format (fourth command).

Figure 6:
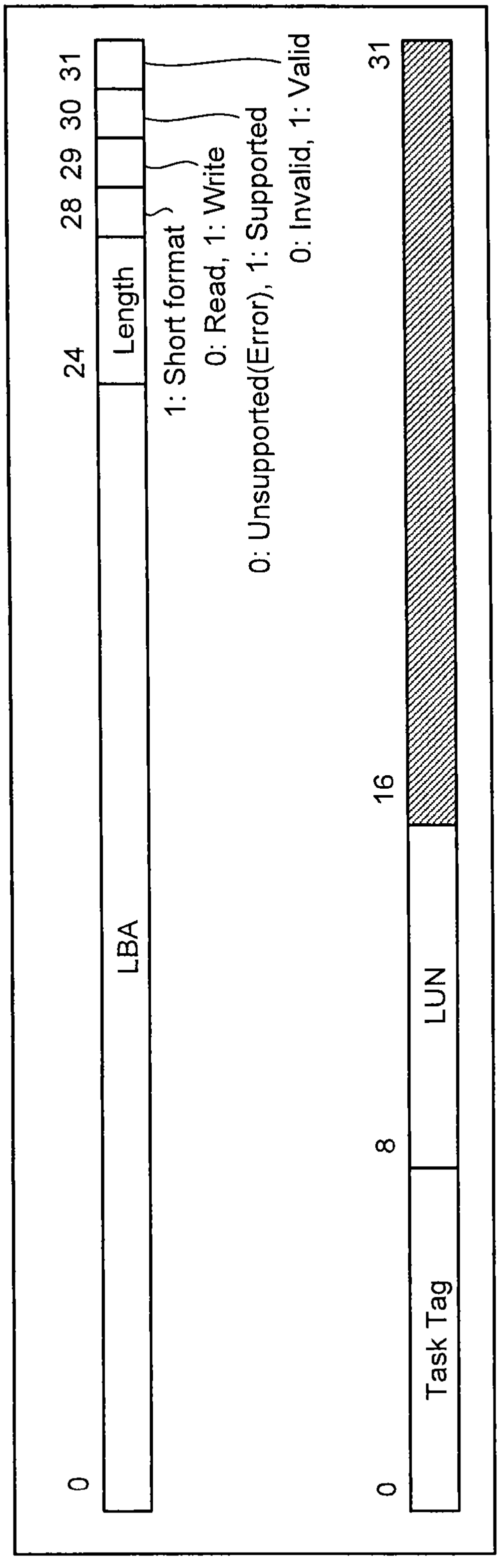
FIG. 6 is a diagram illustrating a short format.

FIG. 6 is a diagram illustrating the short format. As illustrated in FIG. 6, the short format has a size of two words. For the first word, LBA is stored in the field from a zeroth bit to a 23rd bit. Transfer Length (Length) is stored in the field from a 24th bit to a 27th bit. A flag ("1" indicates the short format) indicating the long format or the short format is stored in a 28th bit. The CPU 114 can identify whether the command to be processed is a short format packet or a long format packet with reference to the value of the 28th bit. A flag ("0" indicates a read command and "1" indicates a write command) indicating the read command or the write command is stored in a 29th bit. A flag ("0" indicates failure and "1" indicates success) indicating whether the packing process succeeds or fails is stored in a 30th bit. A flag ("0" indicates invalidity and "1" indicates validity) indicating validity or invalidity is stored in a 31st bit. For the flag in the 31st bit, the flag indicating invalidity is stored during the packing process and the flag indicating validity is stored when the packing process is completed. The CPU 114 can identify whether the command has been subjected to the packing process with reference to the value in the 30th bit and the value in the 31st bit. The second word with the short format includes fields in which LUN (Logical Unit Number) and Task Tag which are respectively stored in field 2 and field 3 in Command UPIU are stored. When the CPU 114 constructs UPIU (for example, Data In UPIU, Ready To Transfer UPIU, or Response UPIU), the same LUN and Task Tag as the corresponding UPIU from the host 2 are used.

In general, single physical storage can be divided into multiple logical storages. Each logical storage is called "Logical Unit", and LUN (Logical Unit Number) is assigned to each Logical Unit for host device to distinguish each Logical Unit. In this and other embodiment, NAND memory 12 is divided into multiple Logical Units, and LUN is assigned to each Logical Unit. In this and other embodiment, LUN included in the command represents which Logical Unit the command is targeted to.

Figure 7:
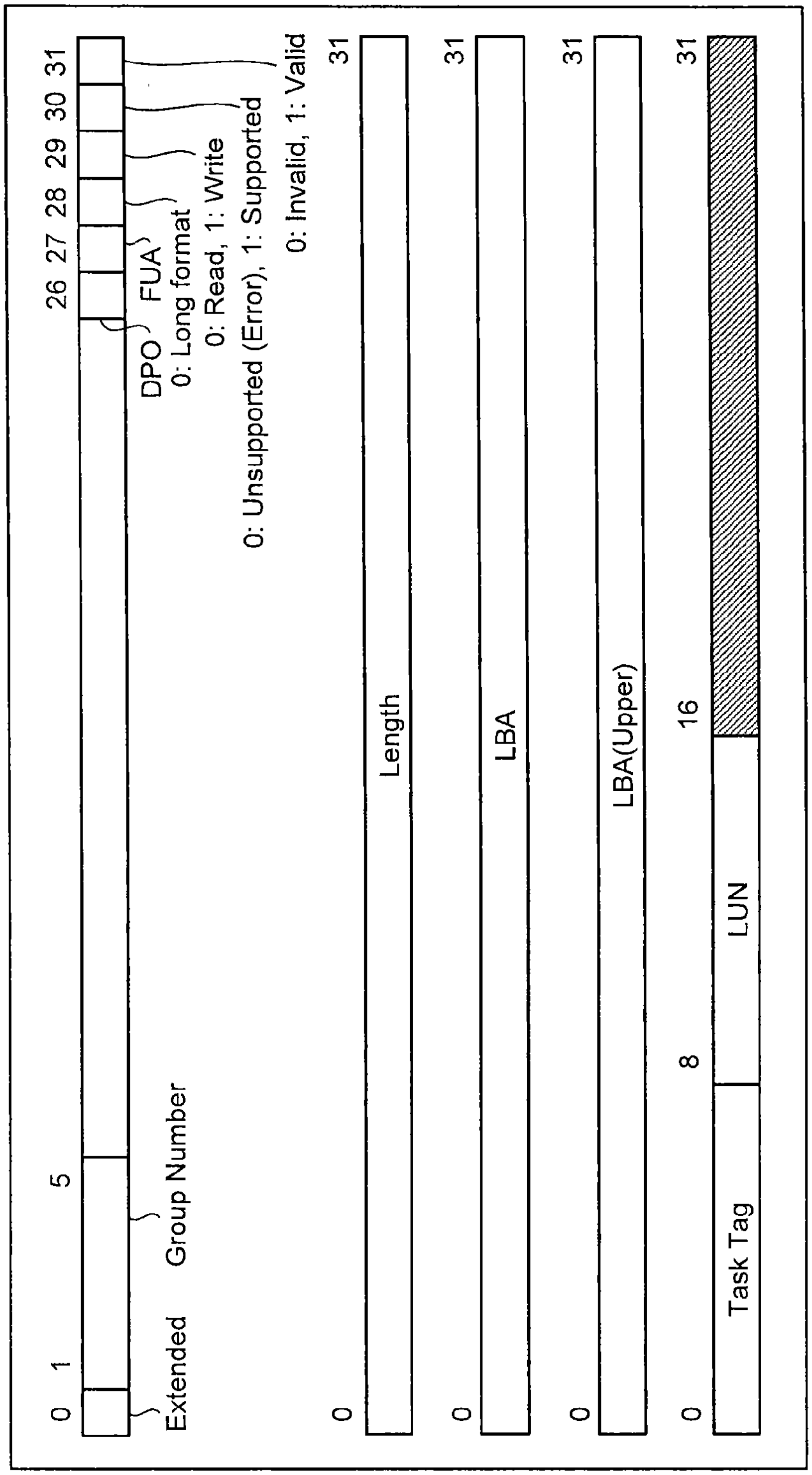
FIG. 7 is a diagram illustrating a long format.

FIG. 7 is a diagram illustrating the long format. As illustrated in FIG. 7, the long format has a size of four words or five words. The first word includes fields from a 28th bit to a 31st bit in which the same flags as those in the short format are stored. "0" indicating the long format is stored in the 28th bit. In addition, the first word includes a field in which a flag indicating whether the format is a 4-word format or a 5-word format is stored in a zeroth bit. Furthermore, Group Number is stored in a field from the first bit to the fifth bit. A DPO flag indicating whether to rewrite another data item on the cache is stored in a 26th bit and an FUA flag indicating whether to enforce disk access (in this embodiment, access to the NAND memory 12) is stored in a 27th bit. The values of Group Number, DPO, and FUA are included in Command UPIU of the read command in which "0x28" or "0x88" is stored in CDB[0]. The values of Group Number, DPO, and FUA are read from Command UPIU and are stored in the fields corresponding to the long format. When any one of the values of Group Number, DPO, and FUA includes a value other than "0", the packing process is performed in the long format, not in the short format. The second word stores Transfer Length (Length). The lower digit of LBA is stored in the third word and the upper digit of LBA is stored in the fourth word. When the upper digit of LBA is "0" and the values of the fourth word are all "0", the fourth word is omitted. The flag in the zeroth bit of the first word can be used to determine whether the fourth word is omitted. The last word stores LUN and Task Tag.

As such, the processing unit 116 removes information which is unnecessary for the process performed by firmware from Command UPIU with a size of 32 bytes (eight words) to reconstruct the command with the short format or the long format. Each of the command with the short format and the command with the long format includes access destination information in a fixed field.

The reception queue 113 can transmit an interrupt signal for notifying the input of a packet to the CPU 114 whenever the packet is input.

The CPU 114 performs the transmission or reception of UPIU between the host 2 and the host device controller 11*a* under the control of a predetermined program (firmware; FW). The CPU 114 can read the command stored in the reception queue 113 and can execute the program corresponding to the read command. In addition, the CPU 114 can construct UPIU (Data In UPIU, Ready To Transfer UPIU, and Response UPIU) to be transmitted to the host 2 and sequentially store UPIU in the transmission queue 112, as a part of the process corresponding to the command which is read from the reception queue 113. The CPU 114 can control the NAND I/F 115 such that data which is requested by the read command is read from the NAND memory 12. The host I/F 111 can sequentially extract UPIU stored in the transmission queue 112 and transmit the extracted UPIU to the host 2.

Figure 8:
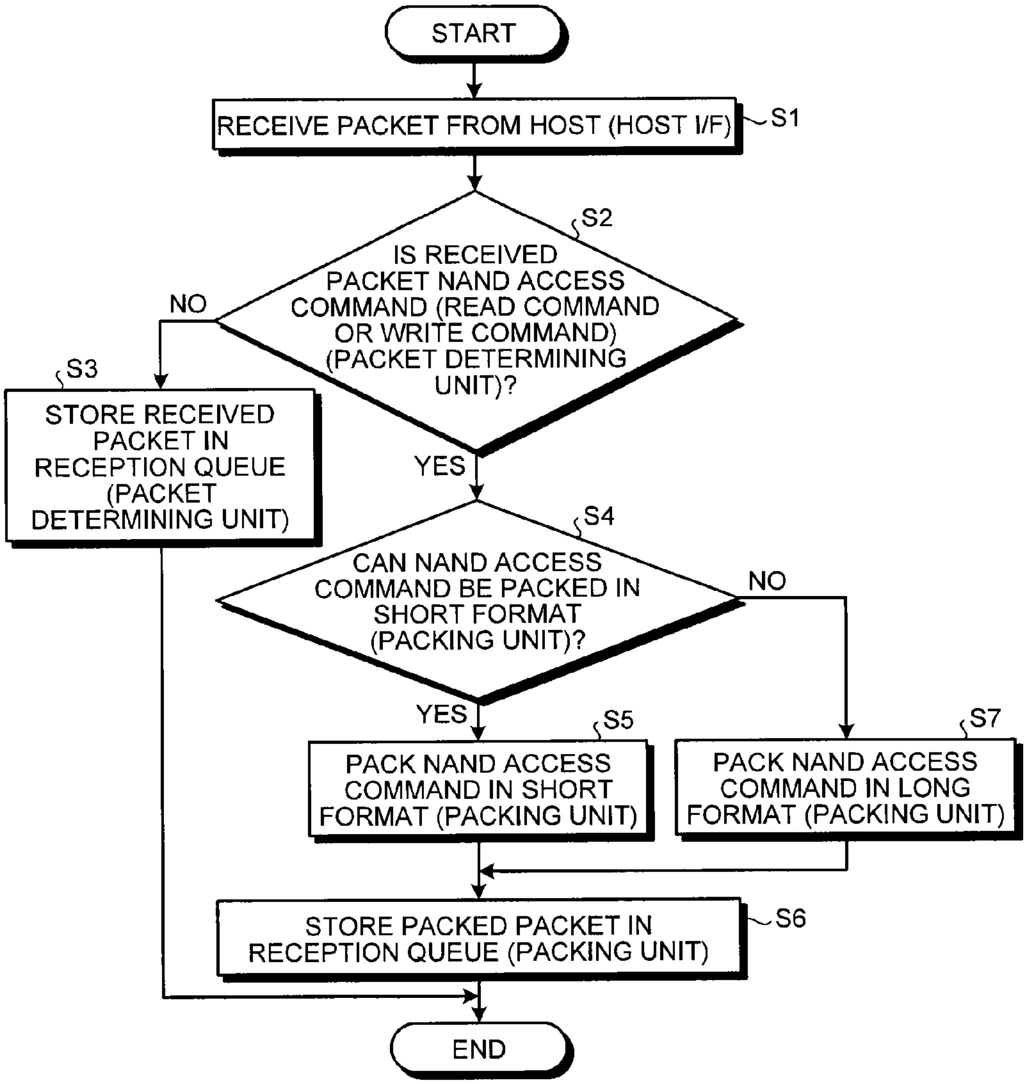
FIG. 8 is a flowchart illustrating an operation of storing a packet in a reception queue.

Next, the operation of the memory device 1 according to the first embodiment will be described. FIG. 8 is a flowchart illustrating an operation of storing a packet in the reception queue 113. First, when the host I/F 111 receives a packet from the host 2 (Step S1), the packet determining unit 117 determines whether the received packet is the NAND access command (Step S2). The packet determining unit 117 determines that the packet is the NAND access command when the lower 6 bits "000001" are stored in field 0 of the received packet, "0" is stored in the second-half 4 bits of field 4, and any one of "0x08", "0x28", "0x88", "0x0a", "0x2a", and "0x8a" is stored in CDB[0].

When the received packet is not the NAND access command (Step S2, No), the packet determining unit 117 stores the received packet in the reception queue 113 (Step S3), and ends the operation.

When the received packet is the NAND access command (Step S2, Yes), the packing unit 118 determines whether the received packet can be packed in the short format (Step S4). A criterion for determining whether the packet can be packed in the short format is not particularly limited. For example, the determination may be performed based on the expressive length of LBA and Transfer Length and the values of Group Number, FUA, and DPO. That is, when the upper digits of LBA and Transfer Length with the short format can be omitted (compressed) since a large number of zeros ("0") are included in the upper digits, the omission of the upper digits makes it possible to store LBA and Transfer Length in the short format, and the values of Group Number, FUA, and DPO are all "0", the packing unit 118 determines that the packet can be packed in the short format. A compression method is not limited to the method of omitting the upper digits.

When the received packet can be packed in the short format (Step S4, Yes), the packing unit 118 packs the received packet in the short format illustrated in FIG. 6 (Step S5), stores the packed packet in the reception queue 113 (Step S6), and ends the operation. In the NAND access command, the filed storing the access destination information varies depending on the type of NAND access command. In Step S5, the packing unit 118 determines the type of NAND access command based on the value of CDB[0], determines an extraction source field of the access destination information based on the determination result, and extracts the access destination information from the determined field. Then, the packing unit 118 stores the extracted access destination information in a fixed field of the short format. In addition, in Step S5, the packing unit 118 sets the values of various flags of the first word.

When it is difficult to pack the received packet in the short format (Step S4, No), the packing unit 118 packs the received packet in the long format illustrated in FIG. 7 (Step S7) and stores the packed packet in the reception queue 113 (Step S6). In Step S6, the packing unit 118 determines the type of NAND access command based on the value of CDB[0], determines the extraction source field of the access destination information based on the determination result, and extracts the access destination information from the determined field. Then, the packing unit 118 stores the extracted access destination information in a fixed field of the long format. In addition, in Step S7, the packing unit 118 sets the values of various flags of the first word.

After Steps S3 or S6, the operation of storing the packet in the reception queue 113 ends.

Figure 9:
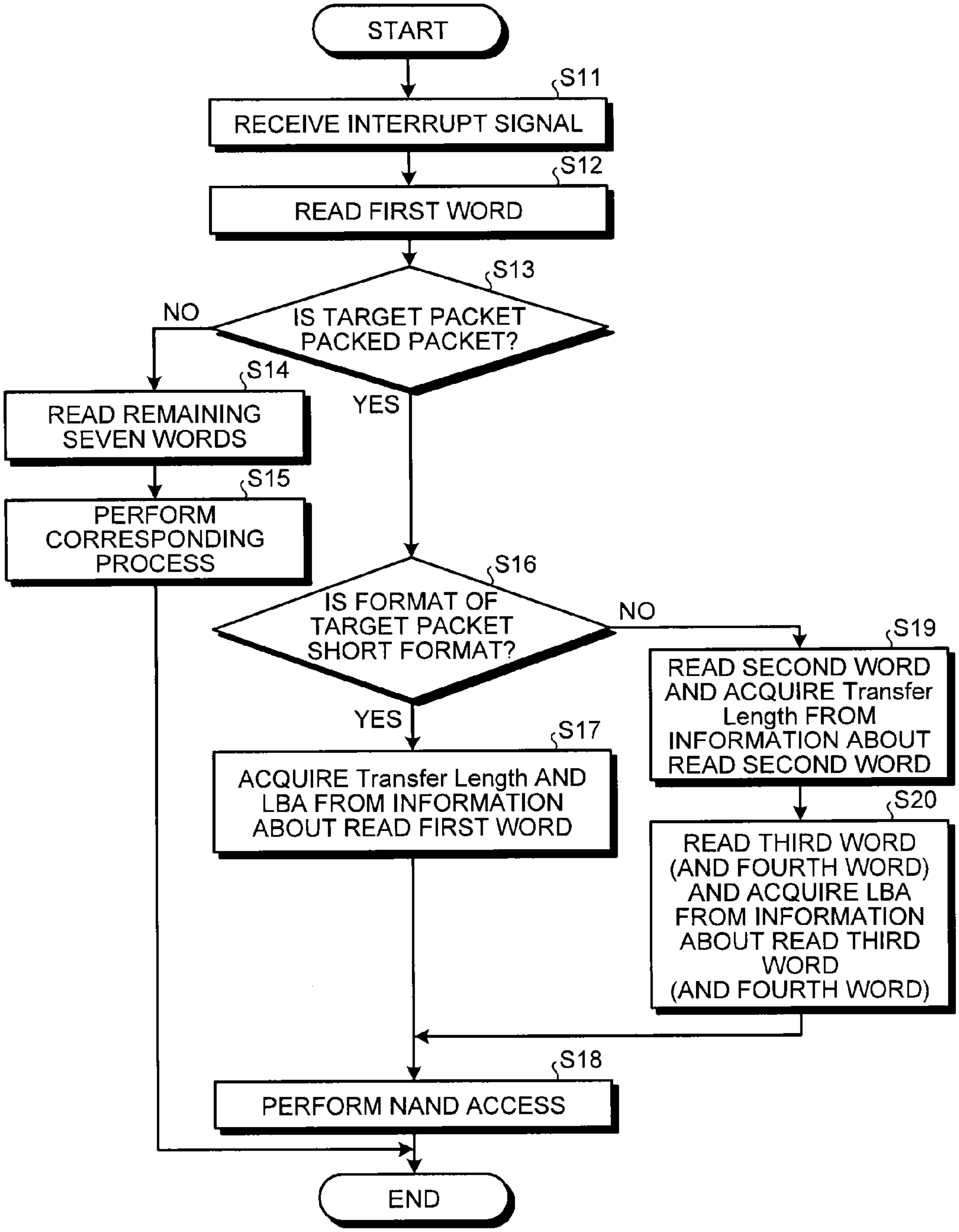
FIG. 9 is a flowchart illustrating the operation of a CPU (firmware)

FIG. 9 is a flowchart illustrating the operation of the CPU 114 (firmware). When receiving an interrupt signal from the reception queue 113 (Step S11), the CPU 114 reads the first word of the packet (target packet) to which the interrupt signal will be issued (Step S12). Then, the CPU 114 determines whether the target packet has been packed based on the read first word (Step S13). It is possible to determine whether the target packet has been packed based on the values of the 30th bit and the 31st bit of the target packet.

When the target packet has not been packed (Step S13, No), the CPU 114 reads the remaining seven words of the target packet (Step S14). Then, the CPU 114 performs a process corresponding to the target packet based on a total of eight words read information items (Step S15) and ends the operation.

When the target packet has been packed (Step S13, Yes), the CPU 114 determines whether the format of the target packet is the short format (Step S16). It is possible to determine whether the format of the target packet is the short format based on the value of the 28th bit of the read first word. When the format of the target packet is the short format (Step S16, Yes), the CPU 114 acquires Transfer Length and LBA from information about the read first word (Step S17), performs NAND access based on the acquired information (Step S18), and ends the operation.

When the format of the target packet is not the short format (Step S16, No), the CPU 114 reads the second word of the target packet and acquires Transfer Length from information about the read second word (Step S19). In addition, the CPU 114 reads the third word of the target packet and acquires LBA from information about the read third word (Step S20). The CPU 114 reads the fourth word of the target packet in Step S20, if necessary. It is possible to determine whether the fourth word of the target packet is needed with reference to the zeroth bit in the information about the first word of the target packet. After Step S20, the CPU 114 performs Step S18.

In this embodiment and second embodiment, it is assumed that device controller 11*a* has a plurality of reception queues 113 and each reception queue 113 is provided for each LUN. In other words, the commands with different LUN are stored in different reception queues 113. In this way, it is not required for CPU 114 to read LUN from command stored in the reception queue 113. It is also possible not to provide reception queue 113 for each LUN. In that case, CPU 114 read LUN from commands stored in the reception queue 113.

As such, according to the first embodiment, the packet determining unit 117 determines whether the command received from the host 2 is an access command. When it is determined that the command received from the host 2 is the access command, the packing unit 118 extracts access destination information from the command and performs a packing process to generate a command which includes the extracted access destination information and has a size less than that of the command received from the host 2. The CPU 114 executes the command packed by the packing unit 118. That is, according to the first embodiment, for the NAND access command which is frequently issued and has a high response rate, before the arrival of a command is notified to firmware, hardware determines the type of command, removes unnecessary information from the command, and converts the format of the command such that the firmware can acquire necessary information with a minimum number of accesses. Since the amount of information, which is an access target from firmware to hardware, can be reduced, the processing efficiency of the firmware is improved. As a result, the access performance of the memory device 1 is improved.

The command from the host 2 includes command type information in fixed field 17 and command execution content information in the field which is defined for each command type information item. The access destination information is stored in a command execution content information field. The packet determining unit 117 determines whether the command from the host 2 is a NAND access command based on the command type information. The packing unit 118 extracts the access destination information from the field corresponding to the command type information. In this way, even when the access destination information is stored in the field which is different for each command type, hardware can reliably extract the access destination information from the command received from the host 2.

When there are a plurality of command types in the NAND access command, firmware reads the command, determines the type of command, and acquires the access destination information from the position which is different for each command type in the related art. However, according to the first embodiment of the invention, the packing unit 118 extracts the access destination information from the field which is different for each type of NAND access command, stores the extracted access destination information in the fixed field, and transmits the access destination information to firmware. In this way, the firmware can acquire the access destination information from the same field without determining the type of command. Therefore, the process of the firmware is simplified. As a result, the access performance of the memory device 1 is improved.

Second Embodiment

Figure 10:
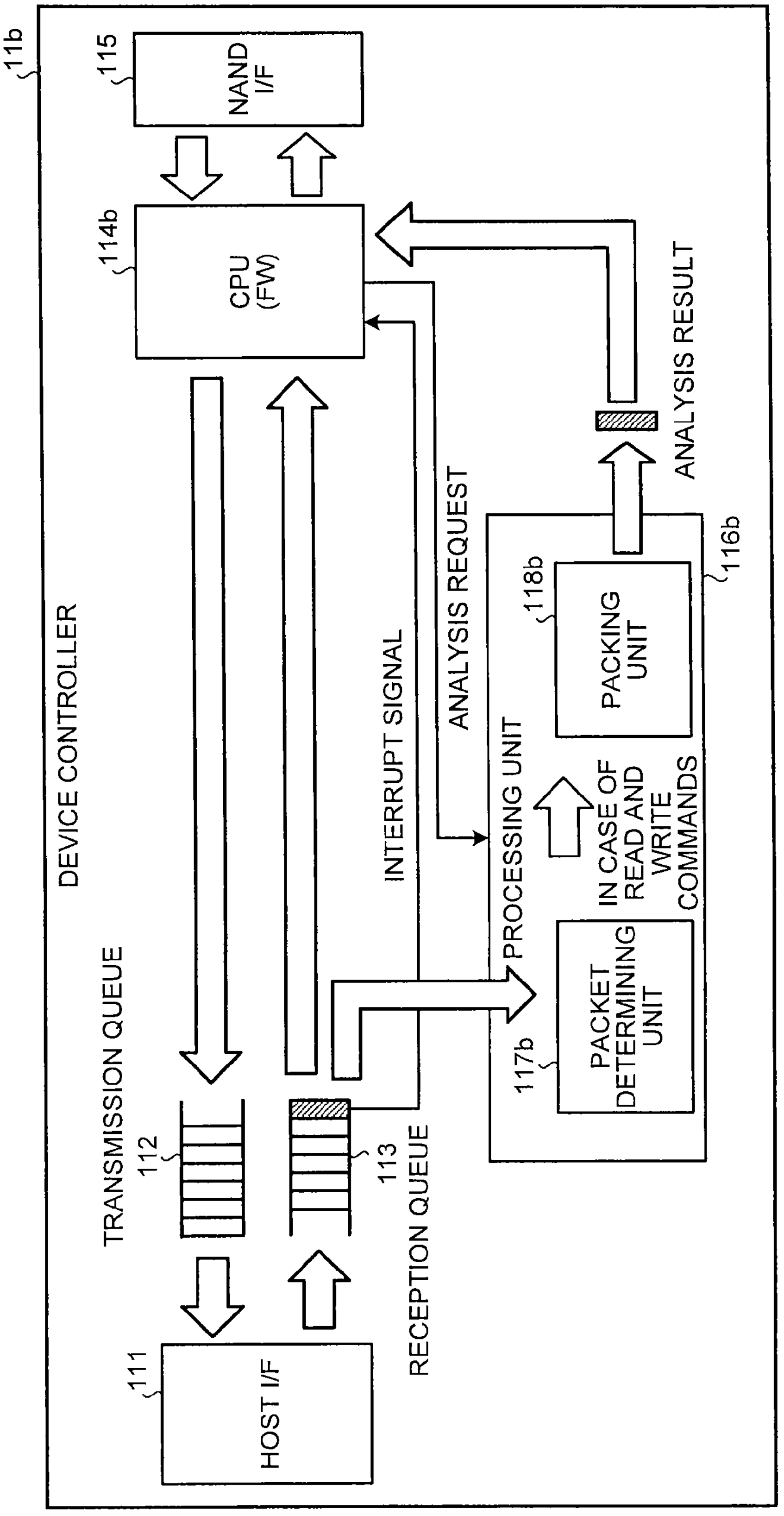
FIG. 10 is a diagram illustrating the structure of a device controller of a memory device according to a second embodiment.

FIG. 10 is a diagram illustrating the structure of a device controller of a memory device 1 according to a second embodiment. A device controller 11*b* according to the second embodiment and a NAND memory 12 form a memory device 1 according to the second embodiment of the invention.

The device controller 11*b* includes a host I/F 111, a transmission queue 112, a reception queue 113, a CPU 114*b*, a NAND I/F 115, and a processing unit 116*b*. The processing unit 116*b* includes a packet determining unit 117*b* and a packing unit 118*b*. The processing unit 116*b* is implemented by a hardware circuit.

The packet received by the host I/F 111 is stored in the reception queue 113. When receiving an interrupt signal indicating that the storage of the packet from the reception queue 113, the CPU 114*b* can transmit an analysis request to the processing unit 116*b*. The packet determining unit 117*b* determines whether the packet stored in the reception queue 113 is a NAND access command, using the reception of the analysis request as a trigger. When the packet is the NAND access command, the packing unit 118*b* can perform the same packing process as that in the first embodiment and transmit the packed NAND access command as the analysis result to the CPU 114*b*.

Figure 11:
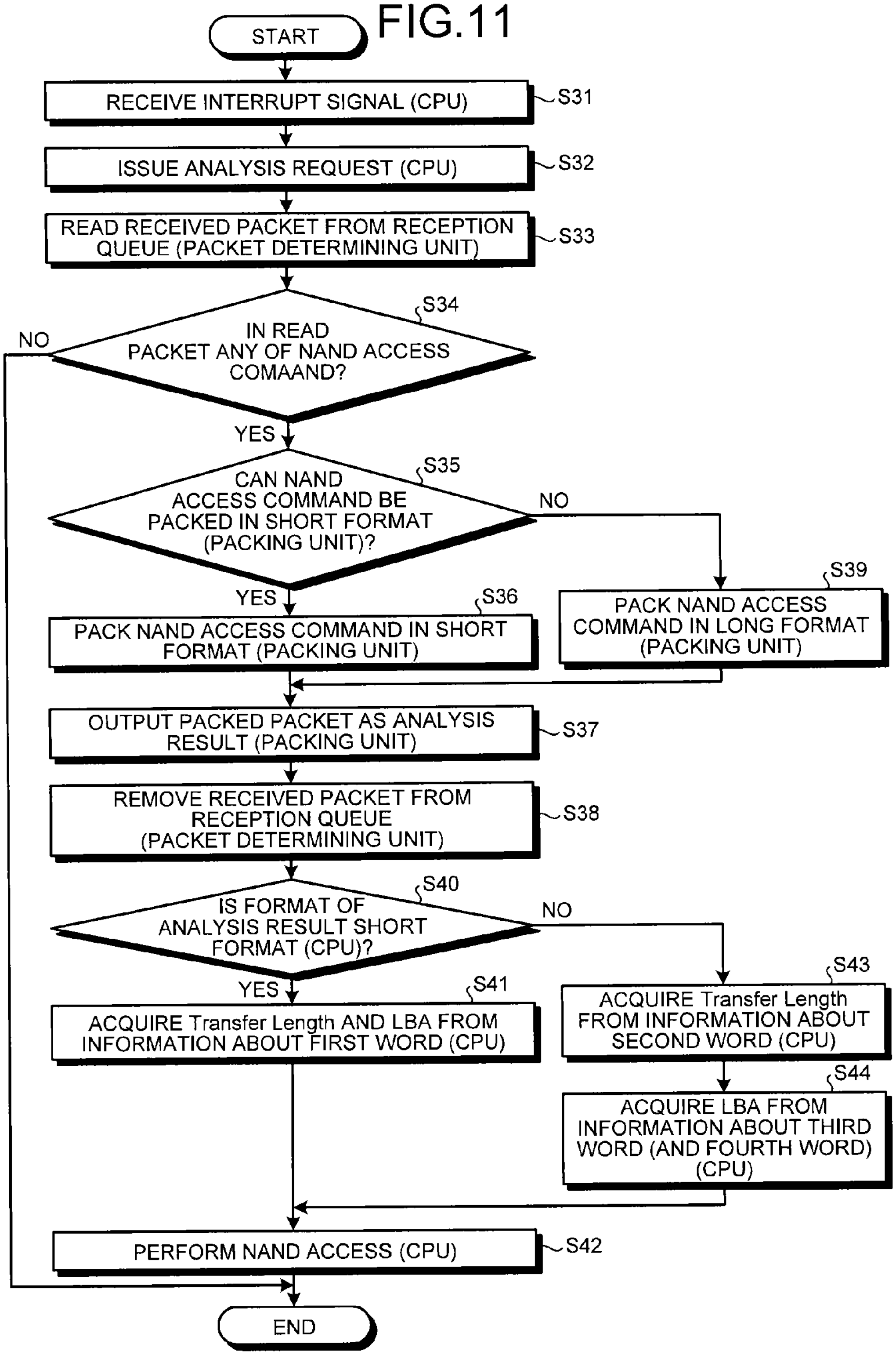
FIG. 11 is a flowchart illustrating the operation of the memory device according to the second embodiment.

FIG. 11 is a flowchart illustrating the operation of the memory device 1 according to the second embodiment. First, when receiving an interrupt signal from the reception queue 113 (Step S31), the CPU 114*b* issues an analysis request to the processing unit 116*b* (Step S32). When receiving the analysis request, the packet determining unit 117*b* reads the received packet from the reception queue 113 (Step S33). Then, the packet determining unit 117*b* determines whether the read packet is a NAND access command (Step S34). When the read packet is not the NAND access command (Step S34, No), the operation ends. The CPU 114*b* can read the received packet from the reception queue 113 and perform a corresponding process.

When the read packet is the NAND access command (Step S34, Yes), the packing unit 118*b* determines whether the packet can be packed in the short format (Step S35). When the read packet can be packed in the short format (Step S35, Yes), the packing unit 118*b* packs the packet in the short format (Step S36) and outputs the packed packet as the analysis result to the CPU 114*b* (Step S37). The packet determining unit 117*b* removes the packet, which is a read source, from the reception queue 113 (Step S38). When it is difficult to pack the read packet in the short format (Step S35, No), the packing unit 118*b* packs the packet in the long format (Step S39) and performs Step S37.

When receiving the analysis result, the CPU 114*b* determines whether the format of the analysis result is the short format (Step S40). When the format of the analysis result is the short format (Step S40, Yes), the CPU 114*b* acquires Transfer Length and LBA from information about the first word of the analysis result (Step S41), performs NAND access (Step S42), and ends the operation.

When the format of the analysis result is not the short format (Step S40, No), the CPU 114*b* acquires Transfer Length from information about the second word of the analysis result (Step S43). In addition, the CPU 114*b* acquires LBA from information about the third word of the analysis result (Step S44). The CPU 114*b* acquires the upper digits of LBA from the fourth word in Step S44, if necessary. After Step S44, the CPU 114*b* performs Step S42.

As such, the memory system 1 can be configured such that the command transmitted from the host 2 is stored in the reception queue 113 and the packet determining unit 117*b* acquires and determines the command from the reception queue 113, using a request from the CPU 114*b* as a trigger.

Third Embodiment

As described above, in some cases, Command UPIU includes a SCSI command. Examples of the SCSI command included in Command UPIU include various types of commands in addition to three types of read commands and three types of write commands. Values stored in field 17 to field 31 of the SCSI command vary depending on the type of SCSI command. The type of SCSI command can be identified by the value of CDB[0] (command type information). That is, a field for storing information (command execution content information) required for a process among field 17 to field 31 can be specified based on the value of CDB[0]. For example, as described above, the field in which Transfer Length and LBA, which are information required for NAND access, in the NAND access command is stored can be specified based on the value of CDB[0].

According to the third embodiment, in a device controller, a CPU acquires the value of CDB[0] first and specifies the field in which information required for a process is stored. Then, the CPU does not read the entire 32-byte Command UPIU from hardware, but limits a read target field to the specified field. In this way, it is possible to reduce the size of information in hardware which is accessed by firmware.

Figure 12:
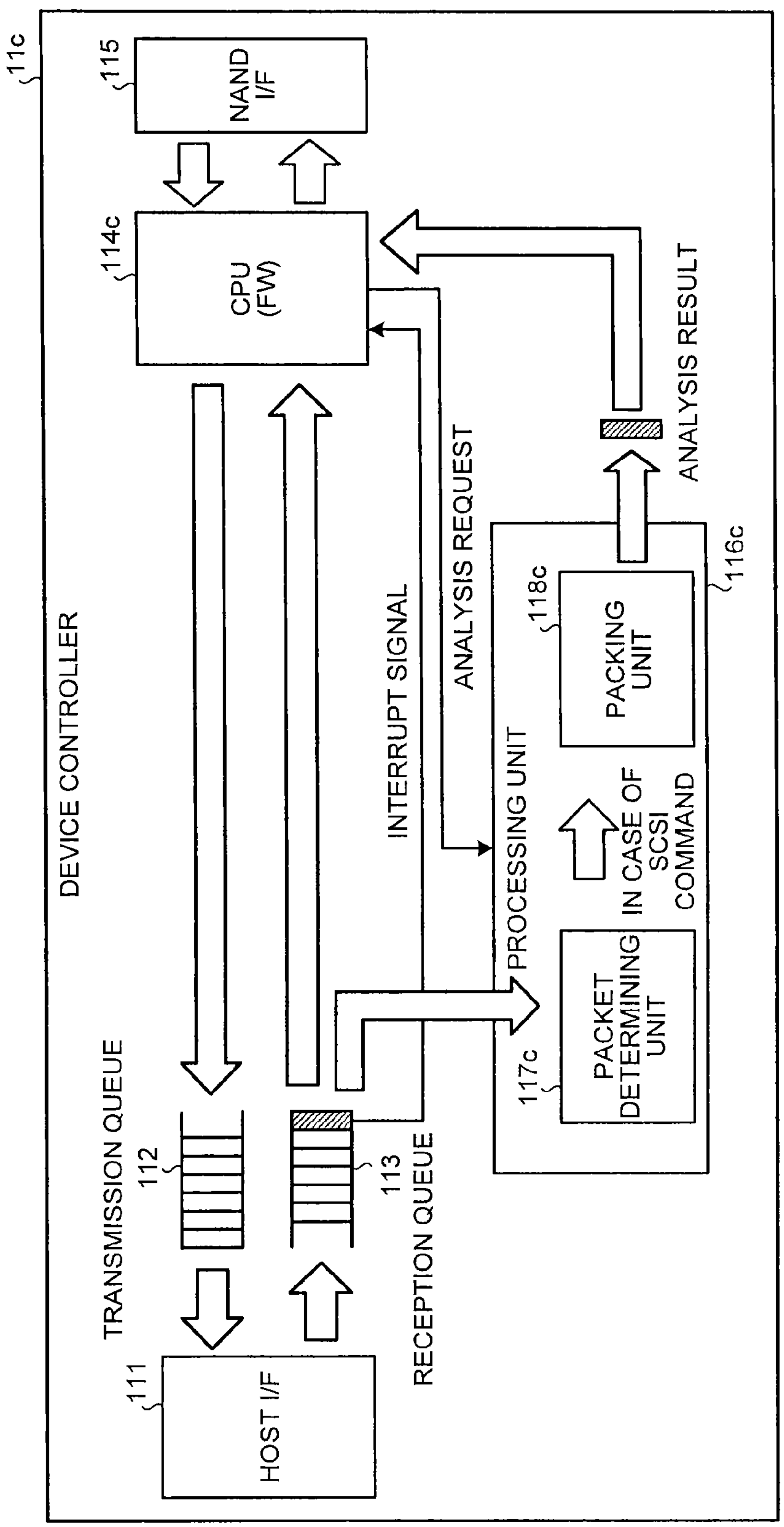
FIG. 12 is a diagram illustrating the structure of a device controller of a memory device according to a third embodiment.

FIG. 12 is a diagram illustrating the structure of the device controller of a memory device 1 according to the third embodiment. A device controller 11*c* according to the third embodiment includes a host I/F 111, a transmission queue 112, a reception queue 113, a CPU 114*c*, a NAND I/F 115, and a processing unit (extraction unit) 116*c*. The processing unit 116*c* includes a packet determining unit 117*c* and a packing unit 118*c*. The processing unit 116*c* is implemented by a hardware circuit.

The packet received by the host I/F 111 is stored in the reception queue 113. When receiving an interrupt signal indicating the storage of the packet from the reception queue 113, the CPU 114*c* can transmit an analysis request to the processing unit 116*c*. The packet determining unit 117*c* determines whether the packet (hereinafter, referred to as a target packet) stored in the reception queue 113 is an SCSI command (exactly, Command UPIU including the SCSI command), using the reception of the analysis request as a trigger. When the target packet is the SCSI command, the packing unit 118*c* reconstructs LUN, Task Tag, and, CDB[0] in the target packet into a packet which includes one word and has a predetermined format and transmits the reconstructed packet as the analysis result to the CPU 114*c*. The target packet remains in the reception queue 113. When receiving the analysis result from the packing unit 118*c*, the CPU 114*c* specifies the field in which information required for the process requested by the target packet is stored based on the value of CDB[0]. Then, the CPU 114*c* reads the information from the specified field in the target packet.

Figure 13:
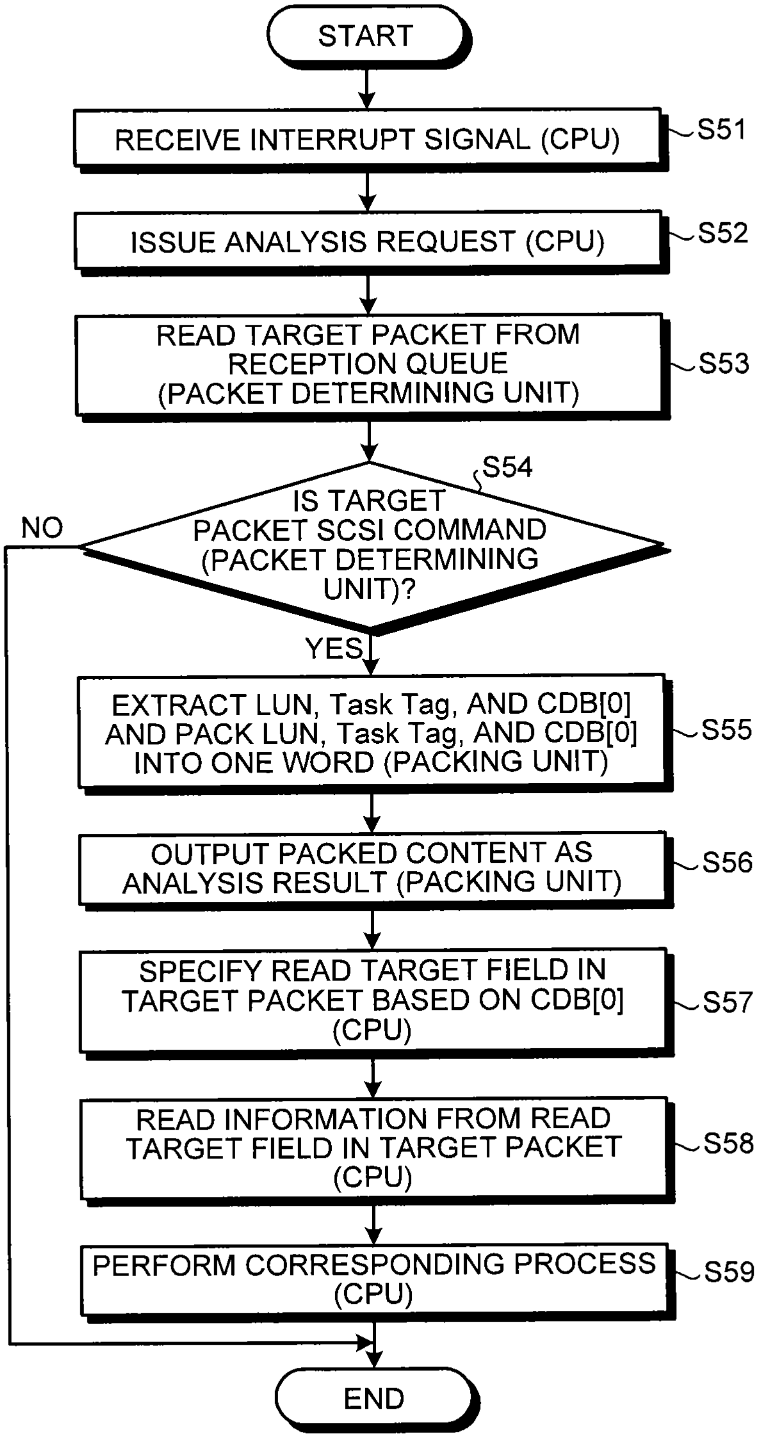
FIG. 13 is a flowchart illustrating the operation of the memory device according to the third embodiment.

FIG. 13 is a flowchart illustrating the operation of the memory device 1 according to the third embodiment. First, when receiving an interrupt signal from the reception queue 113 (Step S51), the CPU 114*c* issues an analysis request to the processing unit 116*c* (Step S52). When receiving the analysis request, the packet determining unit 117*c* reads the target packet from the reception queue 113 (Step S53). Then, the packet determining unit 117*c* determines whether the target packet is the SCSI command (Step S54). When the target packet is not the SCSI command (Step S54, No), the operation ends. The CPU 114*c* can read the target packet from the reception queue 113 and can perform a corresponding process.

When the target packet is the SCSI command (Step S54, Yes), the packing unit 118*c* extracts LUN, TaskTag, and CDB [0] from the packet and packs the extracted values into a one-word format (Step S55). Then, the packing unit 118*c* outputs the packed packet as the analysis result to the CPU 114*c* (Step S56).

When receiving the analysis result, the CPU 114*c* specifies a read target field in the target packet stored in the reception queue 113 based on CDB[0] included in the analysis result (Step S57). Then, the CPU 114*c* accesses only the specified field to acquire information (Step S58). Then, the CPU 114*c* performs a corresponding process based on the acquired information (Step S59) and ends the operation.

As such, according to the third embodiment, the reception queue 113 stores the command received from the host 2. The processing unit 116*c* extracts command type information from the command received from the host 2. The CPU 114*c* specifies the field in which command execution content information is stored based on the command type information extracted by the processing unit 116*c* and reads the command execution content information from the specified field in the command stored in the reception queue 113. In this way, it is possible to reduce the size of information in hardware which is accessed by firmware. As a result, the access performance of the memory device 1 is improved.

Fourth Embodiment

FIG. 14 is a diagram illustrating the structure of Response UPIU. Response UPIU includes 32 fields each having a size of 8 bits, similarly to Command UPIU. In this embodiment, LUN stored in field 2, Task Tag stored in field 3, and Command Set Type stored in the second-half 4 bits of field 4 vary depending on UPIU received from a host 2, but values stored in the other fields are fixed values. Task Tag is a command identifier for identifying each UPIU transmitted from a memory device 1. Task Tag which is attached to UPIU transmitted from the memory device 1 has the same value as Task Tag which corresponds to UPIU and is attached to UPIU transmitted from the host 2. That is, Task Tag indicates the correspondence between UPIU transmitted from the host 2 and UPIU transmitted from the memory device 1. In addition, Data In UPIU and Ready To Transfer UPIU are similar to Response UPIU to the extent that fixed values are stored in the fields which does not vary depending on UPIU received from a host 2 (like LUN, Task Tag of Response UPIU).

According to the fourth embodiment, in a device controller, when UPIU (Data In UPIU, Ready To Transfer UPIU, and Response UPIU) is constructed, firmware designates LUN, Task Tag, and Command Set Type. Then, the hardware constructs UPIU using a predetermined fixed value, and LUN, Task Tag, and Command Set Type designated by the firmware.

Figure 15:
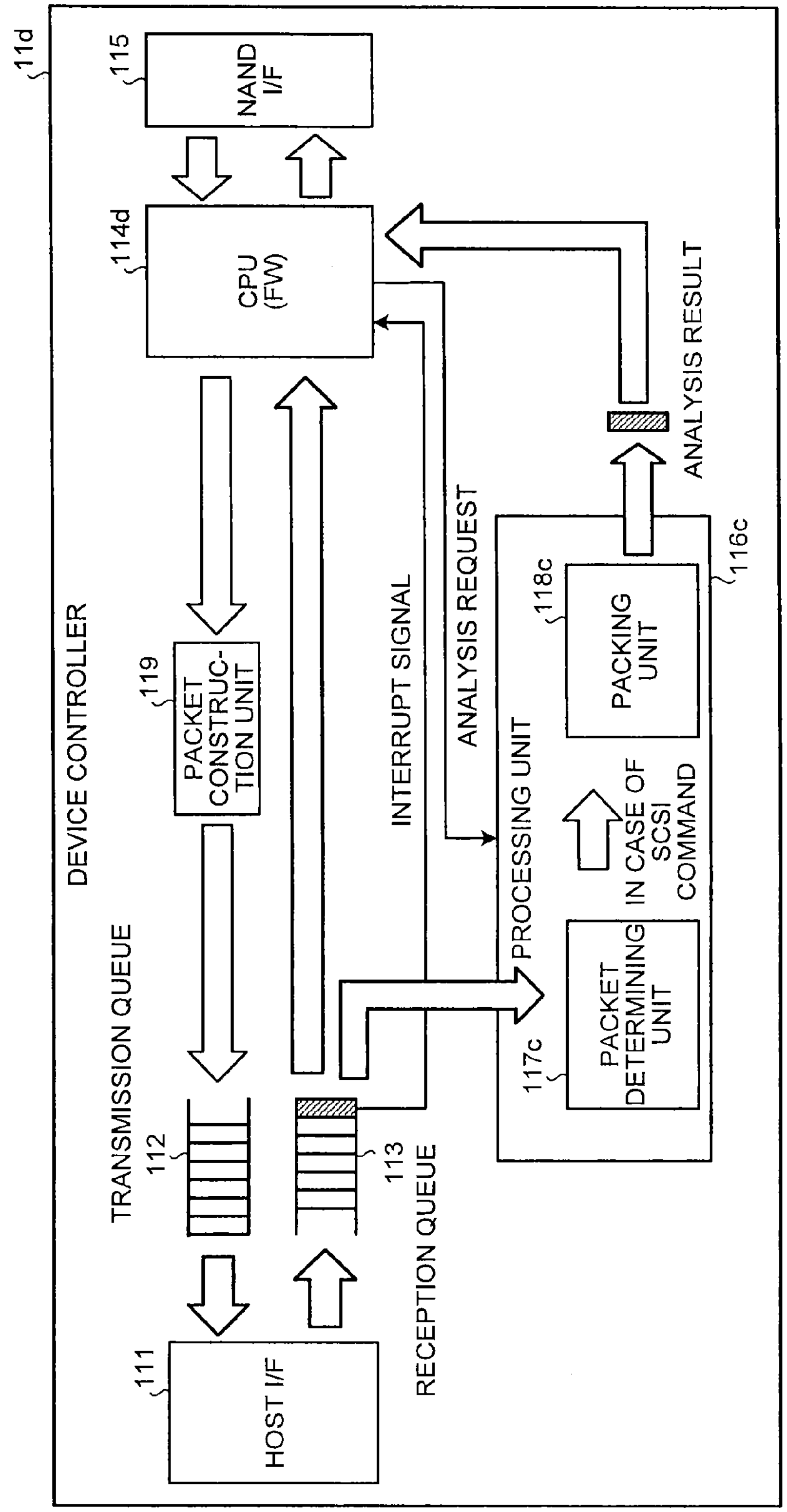
FIG. 15 is a diagram illustrating the structure of a device controller of a memory device according to a fourth embodiment.

FIG. 15 is a diagram illustrating the structure of the device controller of the memory device 1 according to the fourth embodiment. A device controller 11*d* according to the fourth embodiment includes a host I/F 111, a transmission queue 112, a reception queue 113, a CPU 114*d*, a NAND I/F 115, a processing unit 116*c*, and a packet construction unit 119. The processing unit 116*c* includes a packet determining unit 117*c* and a packing unit 118*c*. The processing unit 116*c* is implemented by a hardware circuit. The processing unit 116*c* has the same function as that in the third embodiment. That is, when the packet stored in the reception queue 113 is an SCSI command, the CPU 114*d* can receive the values of LUN, Task Tag, and CDB[0] as the analysis result.

The packet construction unit 119 is implemented by a hardware circuit. The packet construction unit 119 includes a register that receives the input of LUN, Task Tag, and Command Set Type. In addition, fixed values to be stored in fields other than the fields in which LUN, Task Tag, and Command Set Type are stored are set in the packet construction unit 119 in advance. In the packet construction unit 119, fixed values for Data In UPIU, Ready To Transfer UPIU, and Response UPIU are set in advance. The packet construction unit 119 merges the values written from the CPU 114*d* with the predetermined fixed values to generate UPIU and stores the generated UPIU in the transmission queue 112.

Figure 16:
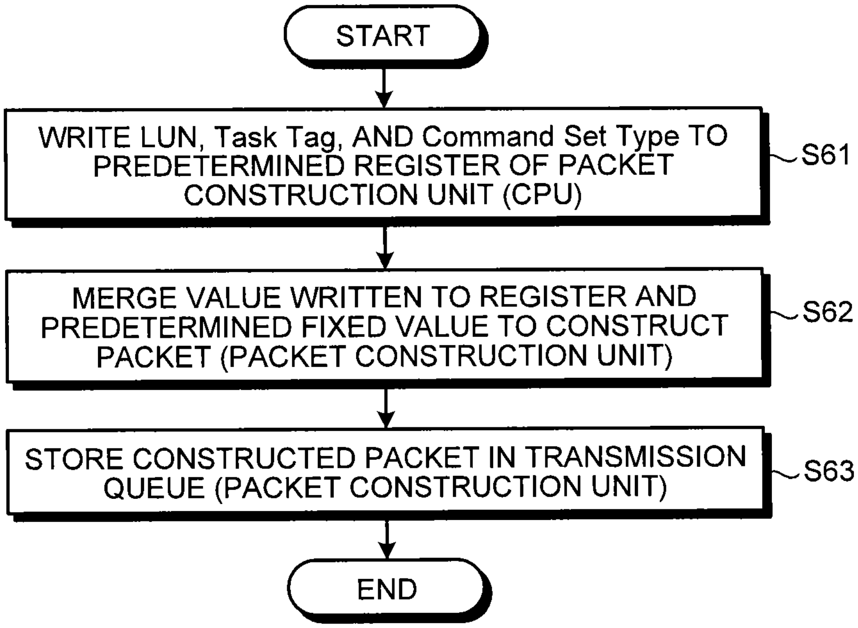
FIG. 16 is a flowchart illustrating the operation of the memory device according to the fourth embodiment.

FIG. 16 is a flowchart illustrating the operation of the memory device 1 according to the fourth embodiment. When transmitting Data In UPIU, Ready To Transfer UPIU, or Response UPIU, the CPU 114*d* writes LUN, Task Tag, and Command Set Type to the register of the packet construction unit 119 (Step S61). In addition, the CPU 114*d* can acquire LUN and Task Tag from the analysis result output from the packing unit 118*c*. The CPU 114*d* writes a value for indentifying UPIU to be transmitted among Data In UPIU, Ready To Transfer UPIU, and Response UPIU as Command Set Type. The packet construction unit 119 merges (combines) the values written to the register with the predetermined fixed values to construct a packet of UPIU (Step S62). Then, the packet construction unit 119 stores the constructed packet in the transmission queue 112 (Step S63) and ends the operation.

As such, according to the fourth embodiment, the CPU 114*d* notifies the packet construction unit 119 of at least a command identifier and the packet construction unit 119 combines the notified command identifier with the predetermined fixed values to generate UPIU. In this way, when firmware generates UPIU, the load of the firmware is reduced. As a result, the access performance of the memory device 1 is improved.

Fifth Embodiment

In a fifth embodiment, a packet construction unit can acquire information from a packet stored in a reception queue.

Figure 17:
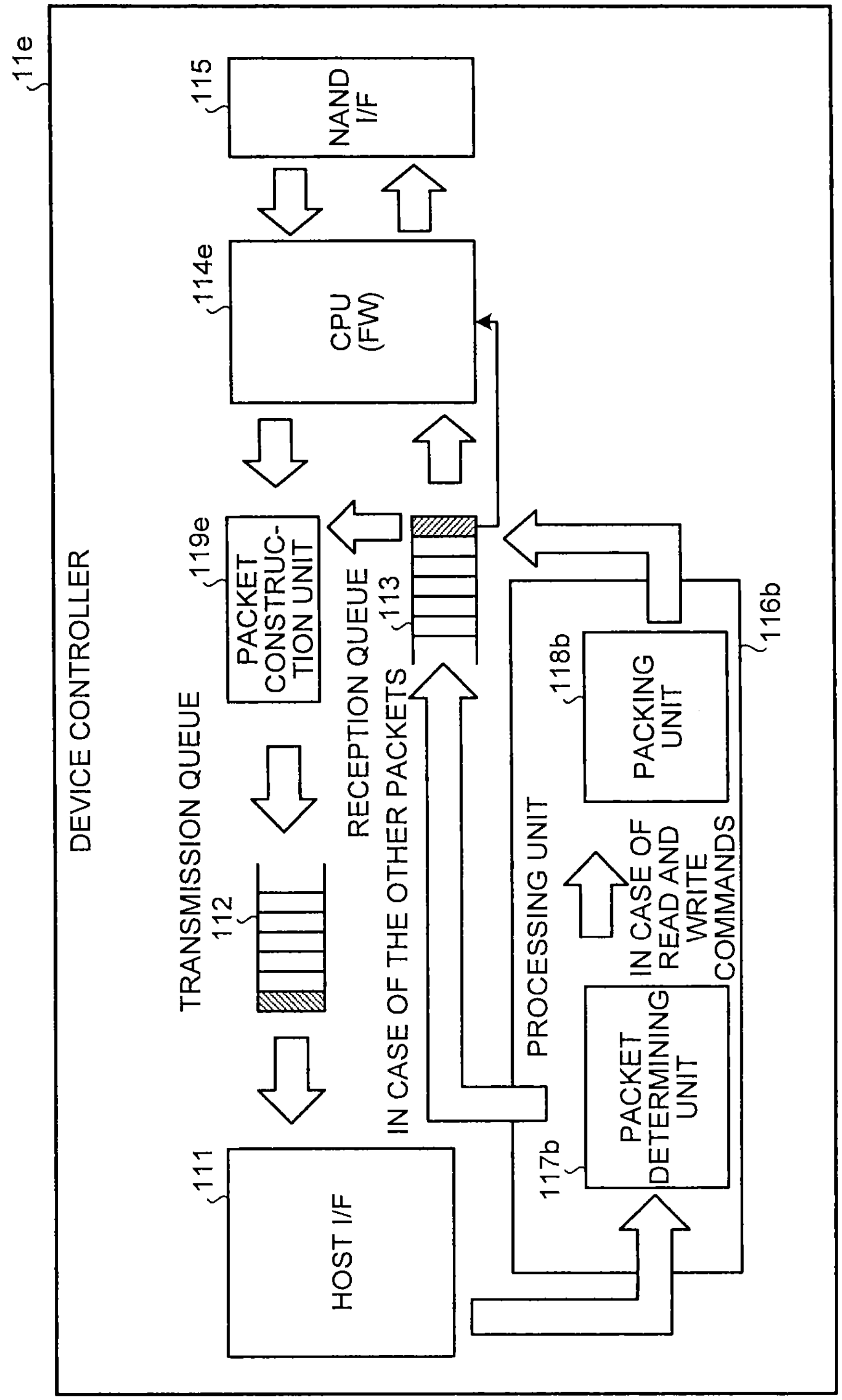
FIG. 17 is a diagram illustrating the structure of a device controller of a memory device according to a fifth embodiment.

FIG. 17 is a diagram illustrating the structure of a device controller of a memory device 1 according to the fifth embodiment. A device controller lie according to the fifth embodiment includes a host I/F 111, a transmission queue 112, a reception queue 113, a CPU 114*e*, a NAND I/F 115, a processing unit 116*b*, and a packet construction unit 119*e*. The processing unit 116*b* includes a packet determining unit 117*b* and a packing unit 118*b*. The processing unit 116*b* is implemented by a hardware circuit. The processing unit 116*b* has the same function as that in the second embodiment.

The packet construction unit 119*e* is implemented by a hardware circuit. The packet construction unit 119*e* includes a register which receives the input of Command Set Type and a number (slot number) designating the slot of the reception queue 113. In addition, fixed values to be stored in fields other than the fields in which LUN, Task Tag, and Command Set Type are stored are set in the packet construction unit 119 in advance. The packet construction unit 119*e* reads LUN and Task Tag from the packet which is stored in the slot designated by the CPU 114*e*, combines the read LUN and Task Tag, Command Set Type input from the CPU 114*e*, and the predetermined fixed values to generate Response UPIU, and stores the generated Response UPIU in the transmission queue 112.

Figure 18:
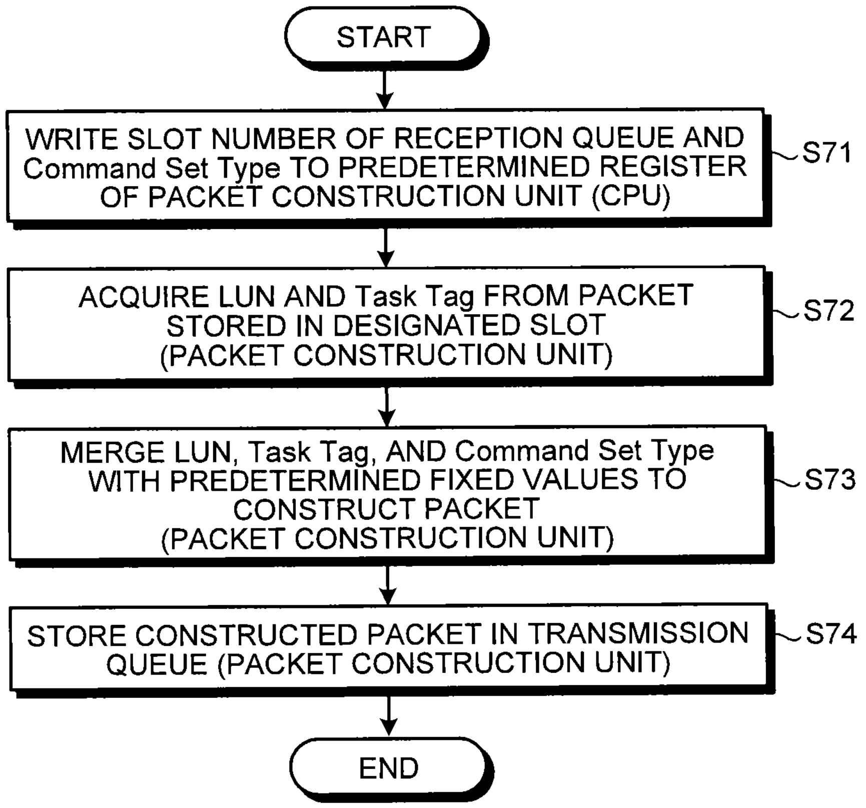
FIG. 18 is a flowchart illustrating the operation of the memory device according to the fifth embodiment.

FIG. 18 is a flowchart illustrating the operation of the memory device 1 according to the fifth embodiment. When transmitting UPIU, the CPU 114*e* writes Command Set Type and the slot number designating the slot of the reception queue 113, which are stored in the packet corresponding to the UPIU, to the register of the packet construction unit 119*e* (Step S71). The packet construction unit 119*e* acquires LUN and Task Tag from the packet which is stored in the slot specified by the written slot number, using the writing of data by the CPU 114*e* as a trigger (Step S72). Then, the packet construction unit 119*e* merges the acquired LUN and Task Tag, Command Set Type which is written to the register by the CPU 114*e*, and the predetermined fixed values to construct a packet (Step S73) and stores the constructed packet in the transmission queue 112 (Step S74). Then, the packet construction unit 119*e* ends the operation.

As such, according to the fifth embodiment, the packet construction unit 119*e* reads at least a command identifier from the packet which is stored in the slot with the number designated by the CPU 114*e* and combines the read command identifier with the predetermined fixed values to generate Response UPIU. In this way, when firmware generates Response UPIU, the load of the firmware is reduced. Therefore, the access performance of the memory device 1 is improved.

Sixth Embodiment

The structure of a memory device according to a sixth embodiment is similar to that of the memory device 1 according to the fifth embodiment except for the operation of a packet construction unit and a CPU. Here, the memory device according to the sixth embodiment will be described using the same names and reference numerals as those in the fifth embodiment.

As described above, when receiving a read command from a host 2, the memory device 1 divides data and transmits the divided data items. After transmitting the last data, the memory device 1 transmits Response UPIU. In the sixth embodiment, a CPU 114*e* writes a predetermined command to a register of a packet construction unit 119*e* when transmitting the last data. After the last data is transmitted, the packet construction unit 119*e* in which the command is written to the register automatically constructs Response UPIU, without requiring other commands written by the CPU 114*e*.

Figure 19:
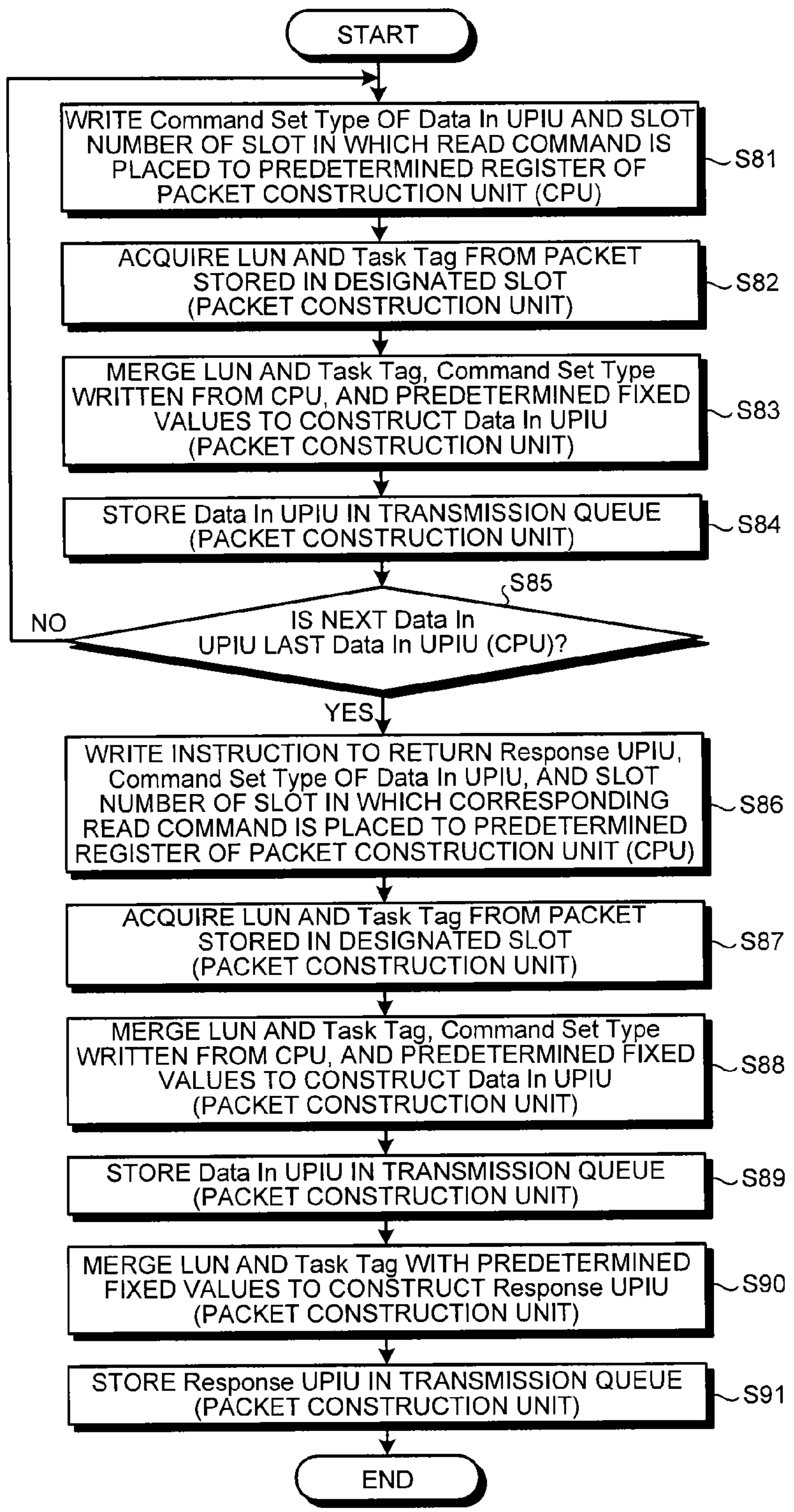
FIG. 19 is a flowchart illustrating the operation of a memory device according to a sixth embodiment.

FIG. 19 is a flowchart illustrating the operation of the memory device 1 according to the sixth embodiment. When transmitting data corresponding to a read command, the CPU 114*e* writes Command Set Type of Data In UPIU and a slot number designating the slot in which the read command is placed to the register of the packet construction unit 119*e* (Step S81). The packet construction unit 119*e* acquires LUN and Task Tag from the packet which is stored in the slot specified by the written slot number, using the writing of data by the CPU 114*e* as a trigger (Step S82). Then, the packet construction unit 119*e* merges the acquired LUN and Task Tag, Command Set Type which is written to the register by the CPU 114*e*, and predetermined fixed values to construct a packet of Data In UPIU (Step S83) and stores the constructed packet and data in the transmission queue 112 (Step S84).

The CPU 114*e* determines whether the next Data In UPIU is the last Data In UPIU (Step S85). When the transmission of data requested by the read command is completed by the next Data In UPIU, the CPU 114_e_ can determine that the next Data In UPIU is the last Data In UPIU. When the next Data In UPIU is not the last Data In UPIU (Step S85, No), the CPU 114_e_ performs Step S81 again.

When the next Data In UPIU is the last Data In UPIU (Step S85, Yes), the CPU 114_e_ writes an instruction to return Response UPIU, Command Set Type of Data In UPIU, and the slot number designating the slot in which the read command is placed to the register of the packet construction unit 119_e_ (Step S86). The packet construction unit 119_e_ acquires LUN and Task Tag from the packet which is stored in the slot specified by the written slot number, using the writing of data by the CPU 114_e_ as a trigger (Step S87). Then, the packet construction unit 119_e_ merges the acquired LUN and Task Tag, Command Set Type which is written to the register by the CPU 114_e_, and the predetermined fixed values to construct a packet of Data In UPIU (Step S88) and stores the constructed packet and data in the transmission queue 112 (Step S89).

Then, the CPU 114_e_ merges the acquired LUN and Task Tag and the predetermined fixed values to construct a packet of Response UPIU (Step S90) and stores the constructed packet in the transmission queue 112 (Step S91). Then, the packet construction unit 119_e_ ends the operation.

As such, according to the sixth embodiment, when Data In UPIU is transmitted to the host 2, the CPU 114_e_ determines whether the reading operation is completed by Data In UPIU which is the next transmission target. When reading operation is completed by Data In UPIU which is the next transmission target, the CPU 114_e_ writes an instruction to return Response UPIU to the packet construction unit 119_e_. When the instruction to return Response UPIU is written, the packet construction unit 119_e_ constructs Data In UPIU, which is the next transmission target, and then automatically constructs Response UPIU. In this way, the process of firmware constructing Response UPIU and transmitting Response UPIU to hardware is not needed. Therefore, the access performance of the memory device 1 is improved.

Seventh Embodiment

There is a UMA (Unified Memory Architecture) in which a plurality of arithmetic processors share one memory. The use of the UMA makes it possible to reduce memory costs.

Figure 20:
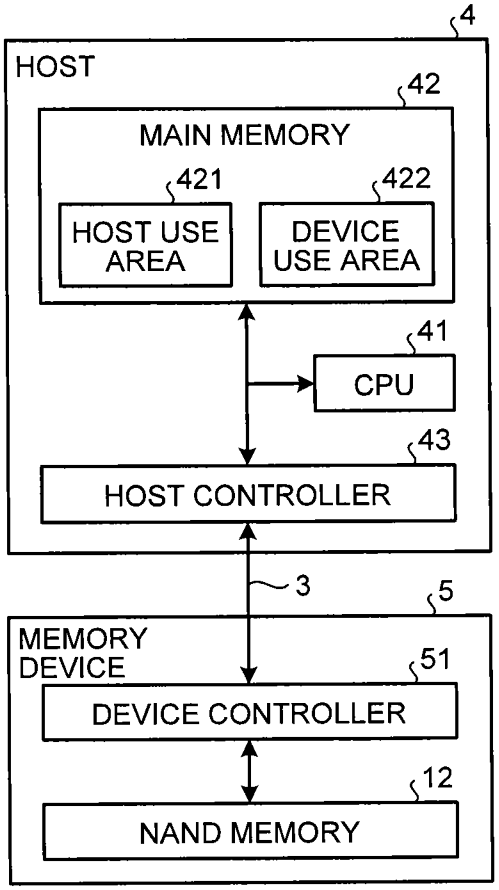
FIG. 20 is a schematic diagram illustrating a system to which UMA is applied.

FIG. 20 is a schematic diagram illustrating a system to which the UMA is applied. A memory device 5 is connected to a host 4 through a communication path 3. The memory device 5 includes a device controller 51 and a NAND memory 12. The device controller 51 can transmit data between the host 4 and the NAND memory 12.

The host 4 includes a CPU 41, a main memory 42, and a host controller 43. The main memory 42 includes a host use area 421 and a device use area 422. The CPU 41 controls the overall operation of the host 4. The CPU 41 stores data to be written from the host 4 to the memory device 5 in the host use area 421 and can issue a write command to write the data stored in the host use area 421 to the memory device 5. In addition, the CPU 41 can issue a read command to transmit the data written to the memory device 5 to the host use area 421. The write command and the read command are transmitted to the memory device 5 through the host controller 43. The write command and the read command are transmitted and received as packets based on the UFS standard.

The device controller 51 of the memory device 5 can use the main memory 42 of the host 4 as a cache. Specifically, the device controller 51 uses the device use area 422 as the cache.

Figure 21:
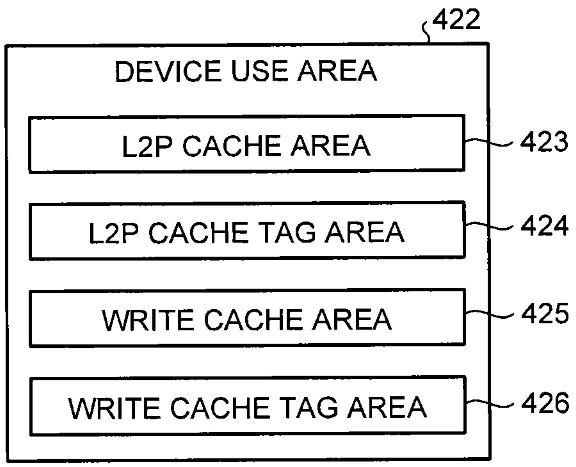
FIG. 21 is a diagram illustrating the memory structure of a device use area.

FIG. 21 is a diagram illustrating the memory structure of the device use area 422. As illustrated in FIG. 21, the device use area 422 includes an L2P cache area 423, an L2P cache tag area 424, a write cache area 425, and a write cache tag area 426. The NAND memory 12 stores address conversion information (not illustrated) in which LBA which is used by the host 1 to access the memory system 2 is associated with the physical address of the NAND memory 12. The L2P cache area 423 is an area in which the address conversion information is cached. The L2P cache tag area 424 is an area in which tag information for determining whether the cache is set or missed for the L2P cache area 423 is stored. The write cache area 425 is an area in which data which is requested to be written by the host 4 is cached. The write cache tag area 426 is an area in which tag information for determining whether the cache is set or missed for the write cache area 425 is stored.

In the memory device 5, the device controller 51 can request the host 4 to move data between the host use area 421 and the write cache area 425 in the device use area 422, to read data from the device use area 422, and to write data to the device use area 422. The request of the device controller 51 for the host 4 and the response of the host 4 to the request are transmitted and received as packets (UMPIU) based on an extended standard of the UFS standard. In some cases, the request (the movement request, the read request, and the write request) for the memory device 5 to access the device use area 422 is referred to as a UM access command.

In a seventh embodiment, the memory device 5 removes, from the reception queue, acknowledgement indicating normal ending among the responses to the UM access command which are received from the host 4.

Figure 22:
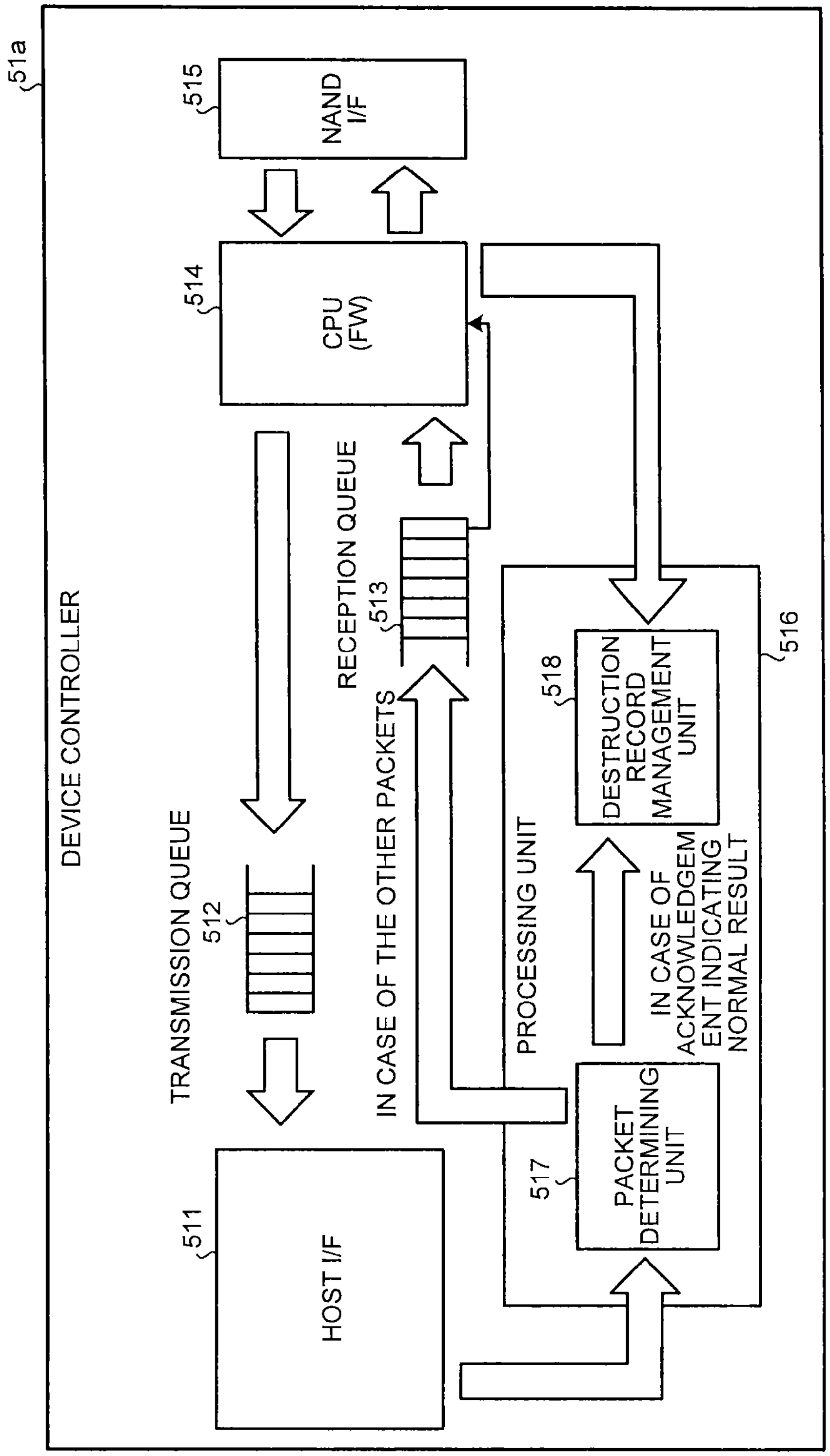
FIG. 22 is a diagram illustrating the structure of a device controller of a memory device according to a seventh embodiment.

FIG. 22 is a diagram illustrating the structure of the device controller of the memory device according to the seventh embodiment. In the seventh to tenth embodiments of the invention, the memory device is represented by reference numeral 5. That is, the NAND memory 12 and the device controller 51 according to the seventh embodiment form the memory device 5 according to the seventh embodiment of the invention.

The device controller 51 includes a host I/F 511, a transmission queue 512, a reception queue 513, a CPU 514, a NAND I/F 515, and a processing unit 516. The processing unit 516 includes a packet determining unit 517 and a destruction record management unit 518. The processing unit 516 is implemented by a hardware circuit. The CPU 514 functions as an access command generating unit that generates the UM access command.

The host I/F 511 is a hardware circuit for connecting the device controller 51 to the host 4 through the communication path 3. The NAND I/F 515 is a hardware circuit for connecting the device controller 51 to the NAND memory 12.

The destruction record management unit 518 is formed by a register. When the packet which is received from the host 4 by the host I/F 511 is an acknowledgement UMPIU indicating normal ending (normal acknowledgement), the packet determining unit 517 records the UM ID (command identifier) of the UMPIU in the destruction record management unit 518. The UM ID attached to the acknowledgement UMPIU is the same as the UM ID of the UM access command which is transmitted from the memory device 5 to the host 4 before the UMPIU is received and indicates correspondence with the UM access command. The CPU 514 can check the process corresponding to the UM access command which has normally ended, with reference to the UM ID recorded in the destruction record management unit 518. In addition, the CPU 514 refers to the destruction record management unit 518 at any time. When the packet which is received from the host 4 by the host I/F 511 is not the acknowledgement indicating normal ending (abnormal acknowledgement), the packet determining unit 517 stores the packet in the transmission queue 512.

Figure 23:
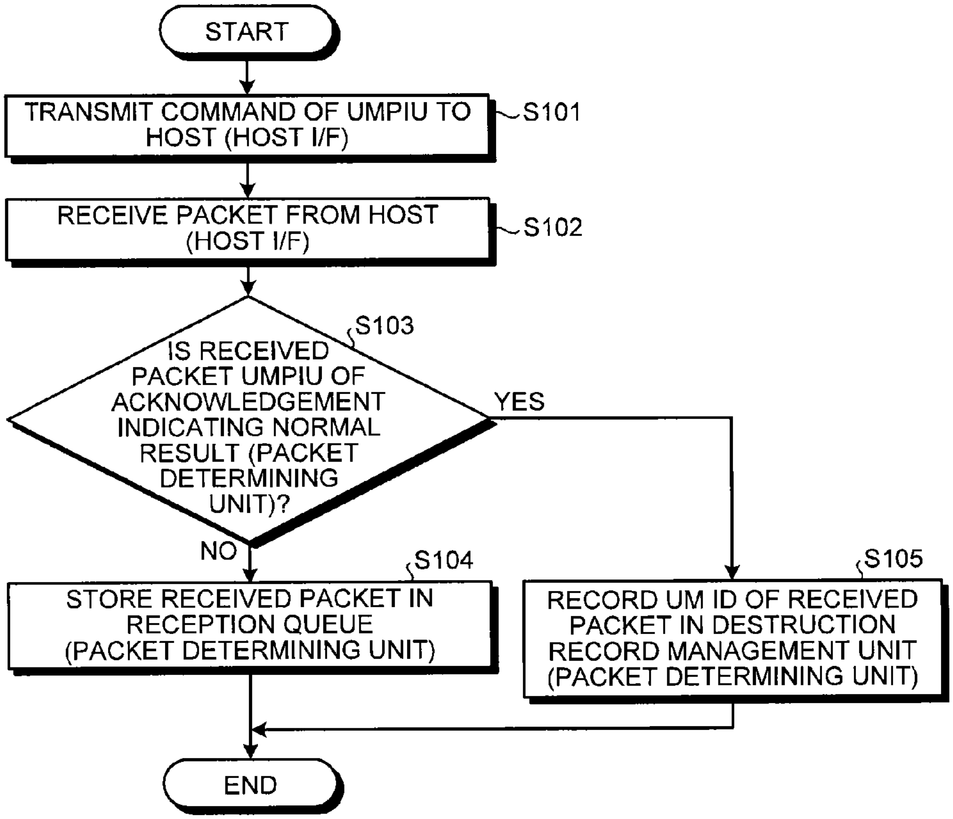
FIG. 23 is a flowchart illustrating the operation of the memory device according to the seventh embodiment.

FIG. 23 is a flowchart illustrating the operation of the memory device 5 according to the seventh embodiment. The host I/F 511 transmits the UM access command of the UMPIU to the host 4 (Step S101). Then, when the host I/F 511 receives a packet from the host 4 (Step S102), the packet determining unit 517 determines whether the received packet is an acknowledgement UMPIU indicating normal ending (Step S103). When the received packet is not an acknowledgement indicating normal ending (Step S103, No), the packet determining unit 517 stores the packet in the reception queue 513 (Step S104) and ends the operation. When the received packet is an acknowledgement indicating normal ending (Step S103, Yes), the packet determining unit 517 records the UM ID attached to the packet in the destruction record management unit 518 (Step S105) and ends the operation.

As such, according to the seventh embodiment, the packet determining unit 517 determines whether the packet from the host 4 is the normal acknowledgement or the abnormal acknowledgement, stores the abnormal acknowledgement in the reception queue 513, and does not store the normal acknowledgement in the reception queue 513. In this way, the process of firmware reading information only for confirmation, such as the normal acknowledgement, from hardware is removed. Therefore, the access performance of the memory device 5 is improved.

In addition, the packet determining unit 517 records the command identifier of the normal acknowledgement in the destruction record management unit 518 which can be read by firmware. In this way, firmware can check the packet which has normally ended at any time.

Eighth Embodiment

In many cases, since the memory device 5 uses the device use area 422 of the main memory 42 as a cache, the size of data read from the memory device 5 is equal to the line size of the cache or the size of tag information. According to an eighth embodiment, when a read UM access command in which Data Length corresponds to a predetermined value is transmitted, firmware simplifies, for example, a process of designating Data Length. In this way, it is possible to reduce the size of information in hardware which is accessed by firmware.

Figure 24:
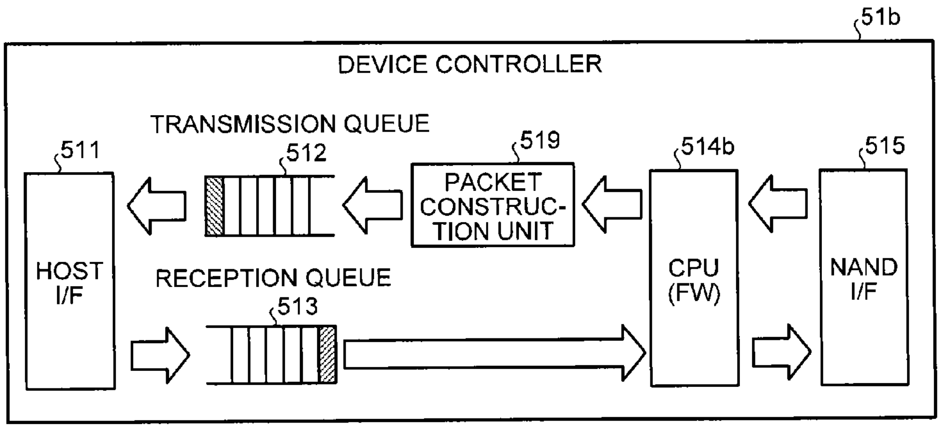
FIG. 24 is a diagram illustrating the structure of a device controller of a memory device according to an eighth embodiment.

FIG. 24 is a diagram illustrating the structure of a device controller of a memory device 5 according to the eighth embodiment. A device controller 51*b* according to the eighth embodiment includes a host I/F 511, a transmission queue 512, a reception queue 513, a CPU 514*b*, a NAND I/F 515, and a packet construction unit 519.

Figure 25:
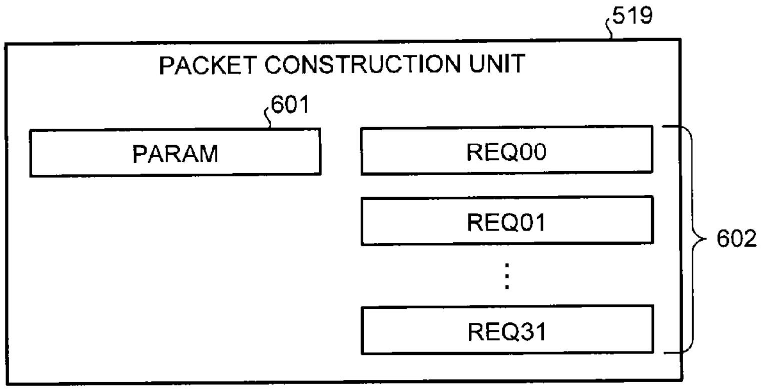
FIG. 25 is a diagram illustrating the structure of a packet construction unit according to the eighth embodiment.

FIG. 25 is a diagram illustrating the structure of the packet construction unit 519 according to the eighth embodiment. The packet construction unit 519 is implemented by a hardware circuit. The packet construction unit 519 includes a register 601 (PARAM) which has a size of one word and in which set information, which will be described below, is stored and 32 registers 602 (REQ00 to REQ31) each having a size of one word. The register 601 and the registers 602 are used by the packet construction unit 519 to receive input from the CPU 514*b*. The packet construction unit 519 constructs a read command UMPIU based on the input from the CPU 514*b*.

Figure 26:
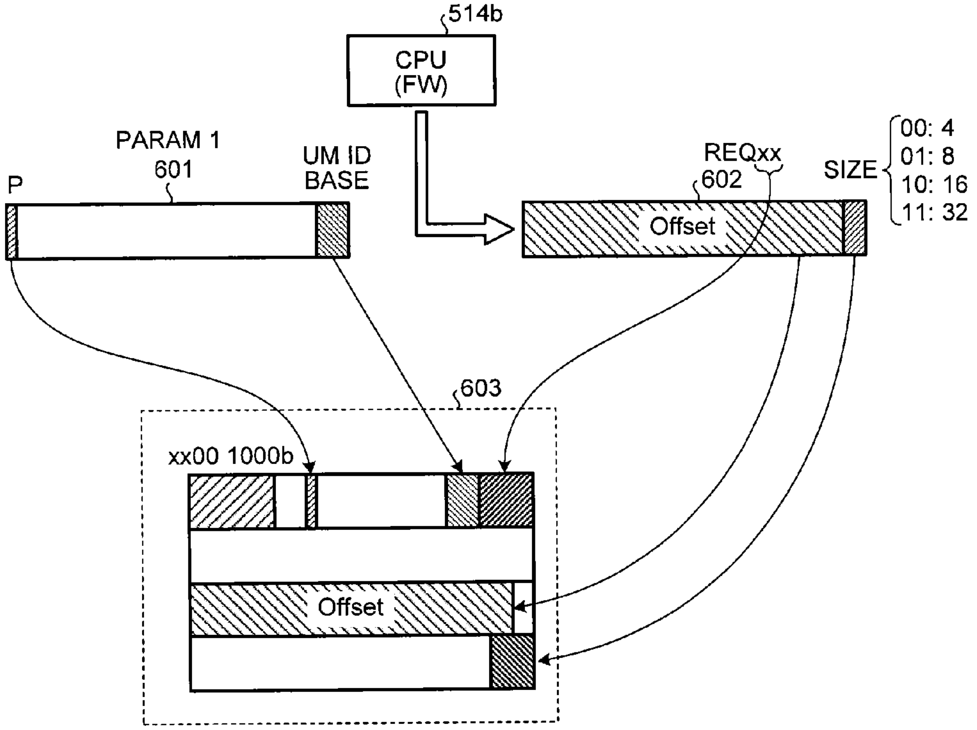
FIG. 26 is a diagram illustrating an aspect in which a read command is constructed from information set in a register.

FIG. 26 is a diagram illustrating an aspect in which a read command is constructed from information set in the register 601 and the registers 602. As illustrated in a read command 603, "xx00 1000b" indicating that the packet is UMPIU is stored at the head of the UMPIU. The UMPIU has a size of 16 bytes. That is, a field in one row of the read command 603 illustrated in FIG. 26 has a size of one word.

Numbers which follows the name "REQ" of the register 602 are predetermined register addresses for identifying the 32 registers 602. The register address of the register 602 functions as a UM ID which is a command identifier for identifying each command constructed by the packet construction unit 519. Specifically, the upper digits of the UM ID are set as one of the set information items in the register 601 in advance. The number which follows the name "REQ" of the register 602 is used as the lower digits (5 bits) of the UM ID. The packet construction unit 519 combines the upper digits of the UM ID set in the register 601 with the register address of the register 602 to generate a UM ID and attaches the generated UM ID to the read command 603. In addition, the register address of the register 602 may be used as the UM ID.

The register 602 stores 2-bit information (size designation information) for designating size information about one of 4 bytes, 8 bytes, 16 bytes, and 32 bytes. The size of the size designation information is less than that of the size information. The packet construction unit 519 decodes the size designation information to calculate the size information and inserts the calculated size information in the read command 603. In addition, the register 602 stores address information of an access destination in the remaining 30 bits. The address information is represented as an offset from the device use area 422. In addition, the address information is aligned with size information about one of (in this embodiment, 4 bytes) of 4 bytes, 8 bytes, 16 bytes, and 32 bytes. The address information is inserted into the read command 603 without any change. Since one of a plurality of predetermined size information items is designated by the size designation information, it is possible to reduce the size of the field for designating Data Length. Since the address information is aligned with a predetermined size information item, it is possible to reduce the size of the field in which the address information is stored. In this way, firmware can set the access destination information in the register (in this embodiment, one word) with a small size. That is, firmware does not create UMPIU with a size of four words and write the created UMPIU to hardware, but creates access destination information with a size of one word and writes the created access destination information to hardware. In this way, a read command UMPIU is constructed. A one-bit P flag is set in the register 601. The P flag designates whether the read command 603 is a read command which is preferentially processed.

Figure 27:
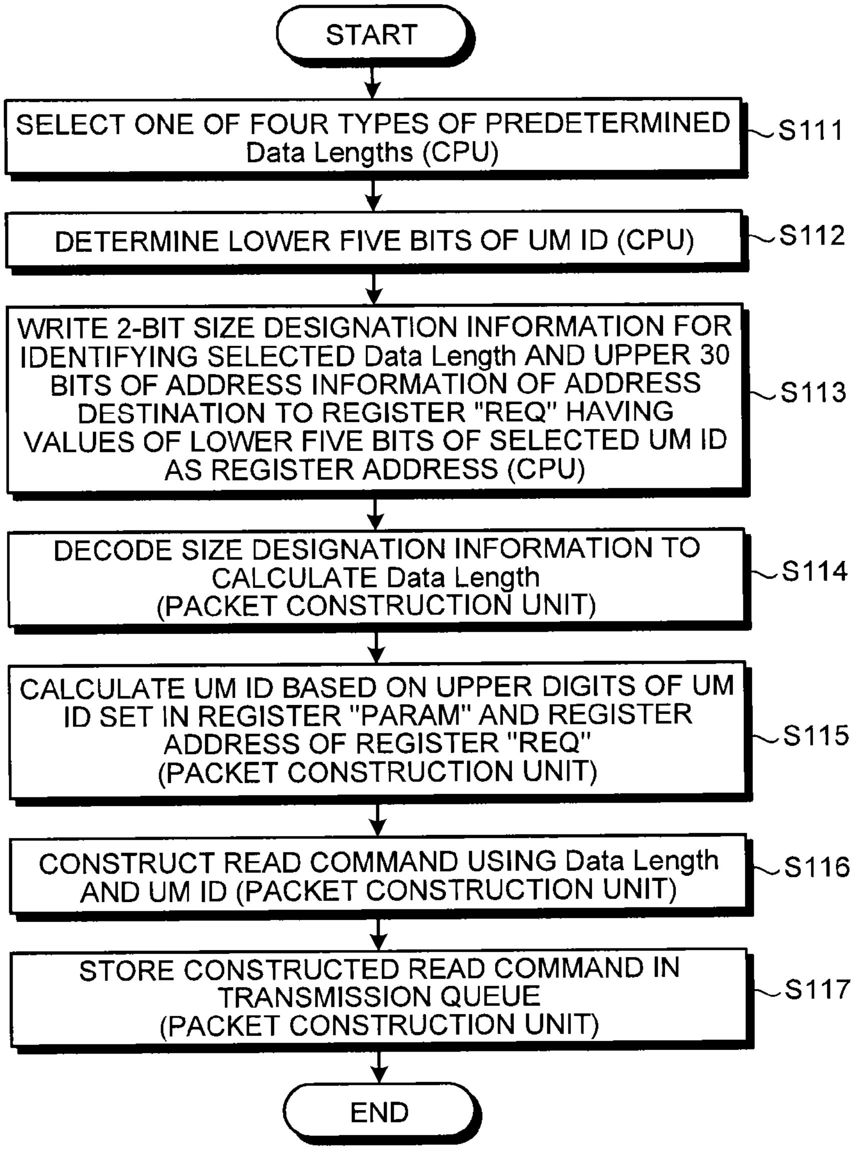
FIG. 27 is a flowchart illustrating the operation of the memory device according to the eighth embodiment.

FIG. 27 is a flowchart illustrating the operation of the memory device 5 according to the eighth embodiment. It is assumed that the upper digits of the UM ID are set in the register 601 in advance. When the read command 603 is transmitted, the CPU 514*b* selects one of four types of predetermined Data Lengths (Step S111). Then, the CPU 514*b* determines the lower 5 bits of the UM ID (Step S112). Then, the CPU 514*b* writes 2-bit size designation information for identifying the selected Data Length and the upper 30 bits of the address information of the access destination to the register 602 "REQ" which has the lower 5 bits of the selected UM ID as a register address (Step S113).

The packet construction unit 519 starts its operation, using the execution of Step S113 as a trigger. First, the packet construction unit 519 decodes the size designation information and calculates Data Length (Step S114). In addition, the packet construction unit 519 calculates a UM ID based on the upper digits of the UM ID set in the register 601 "PARAM" and the register address of the register 602 "REQ" (Step S115). Then, the packet construction unit 519 constructs the read command 603 using the calculated Data Length and UM ID (Step S116). Then, the packet construction unit 519 stores the constructed read command 603 in the transmission queue 512 (Step S117) and ends the operation. The read command 603 stored in the transmission queue 512 is transmitted to the host 4 by the host I/F 511.

As such, according to the eighth embodiment, the CPU 514*b* generates the access destination information indicating the read destination and the command construction unit 519 constructs the read command with a size more than that of the access destination information based on the generated access destination information. In this way, firmware constructs the read command only by generating the access destination information with a size less than that of the read command and writing the access destination information to hardware. Since the size of information in hardware which is accessed by firmware can be reduced, the processing efficiency of firmware is improved. As a result, the access performance of the memory device 1 is improved.

The access destination information generated by the CPU 514*b* includes the size designation information for designating one of a plurality of predetermined size information items. In this way, firmware can represent the size information with data having a small size. Therefore, it is possible to reduce the size of information in hardware which is accessed by firmware.

At least one of the size information items which can be designated is equal to the size of the cache line. Therefore, even when a cache access occurs frequently, firmware can transmit the read command 603 to read the cache with a small number of processes to hardware.

The command construction unit 519 stores the access destination information received from the CPU 514*b* in the register 602 with which each command identifier is associated and attaches the command identifier corresponding to the register 602 having the access destination information stored therein to the read command 603. In this way, the CPU 514*b* can designate the command identifier even when the command identifier is not included in the access destination information and it is possible to reduce the size of information in hardware which is accessed by firmware.

The access destination information generated by the CPU 514*b* includes address information which is aligned with one size among the size information items which can be designated by the size designation information. In this way, firmware can represent the address information with data having a small size. Therefore, it is possible to reduce the size of information in hardware which is accessed by firmware and the processing efficiency of firmware is improved.

Ninth Embodiment

According to a ninth embodiment, a memory device 5 stores a template of UMPIU in hardware in advance and firmware generates only difference information between UMPIU to be transmitted and the template which is stored in hardware in advance.

Figure 28:
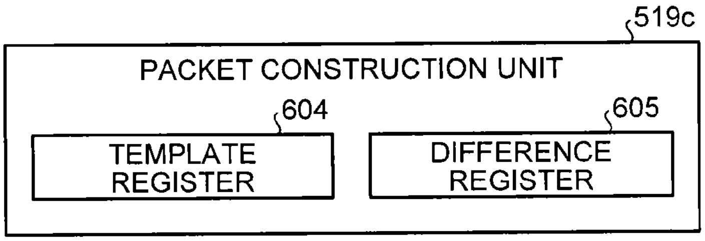
FIG. 28 is a diagram illustrating the structure of a packet construction unit of a memory device according to a ninth embodiment.

FIG. 28 is a diagram illustrating the structure of a packet construction unit of the memory device 5 according to the ninth embodiment. In the ninth embodiment, the structure is similar to that in the eighth embodiment except for a packet construction unit 519*c* and the description of the same structure as that in the eighth embodiment will not be repeated. The packet construction unit 519*c* includes a template register 604 in which the template of the UMPIU of the UM access command is set by the CPU 514*b* and a difference register 605 in which the difference information is set by the CPU 514*b*. In addition, a plurality of template registers 604 may be provided and different templates may be set.

Figure 29:
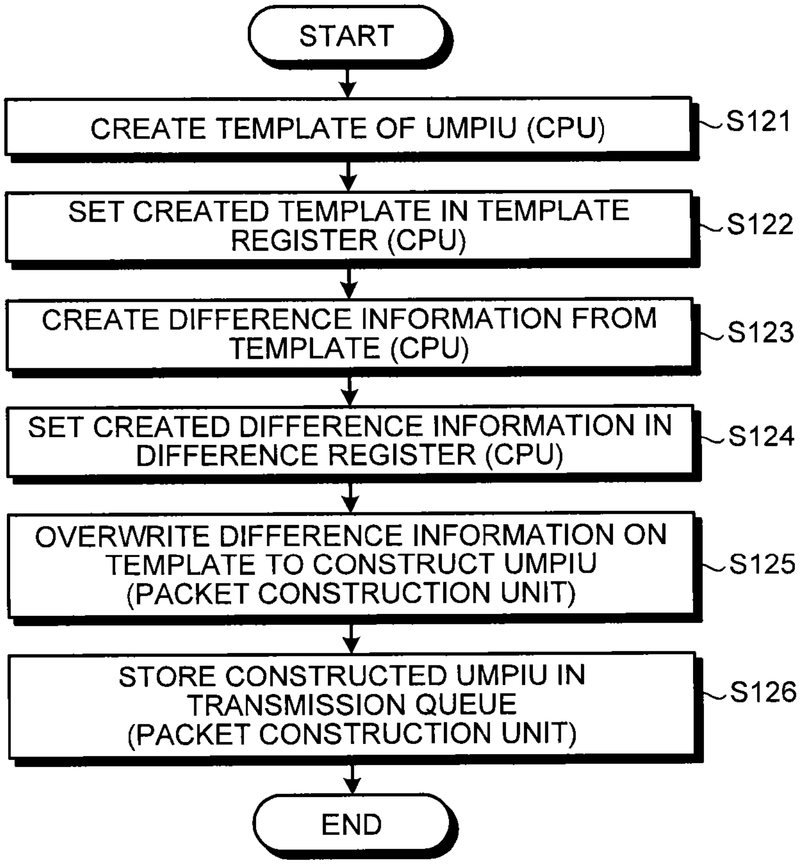
FIG. 29 is a flowchart illustrating the operation of the memory device according to the ninth embodiment.

FIG. 29 is a flowchart illustrating the operation of the memory device 5 according to the ninth embodiment. First, the CPU 514*b* creates the template of UMPIU (Step S121) and sets the created template in the template register 604 (Step S122). Then, the CPU 514*b* creates difference information from the template set in the template register 604 (Step S123) and sets the created difference information in the difference register 605 (Step S124). The packet construction unit 519*c* starts its operation, using the execution of Step S124 as a trigger. Then, the packet construction unit 519*c* overwrites the difference information set in the difference register 605 on the template set in the template register 604 to construct UMPIU (Step S125). Then, the packet construction unit 519*c* stores the constructed UMPIU in the transmission queue 512 (Step S126) and ends the operation.

As such, according to the ninth embodiment, the CPU 514*b* can instruct the packet construction unit 519*c* to construct a UM access command, which is a transmission target, only by writing the difference information between the template which is set in the packet construction unit 519*c* in advance and the UM access command, which is the transmission target, to the packet construction unit 519*c*. Therefore, it is possible to reduce the size of information in hardware which is accessed by firmware and the processing efficiency of firmware is improved. As a result, the access performance of the memory device 5 is improved.

Tenth Embodiment

According to a tenth embodiment, hardware can automatically generate a UM ID.

Figure 30:
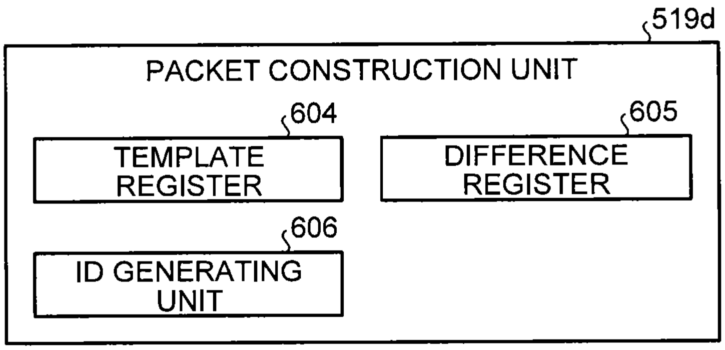
FIG. 30 is a diagram illustrating the structure of a packet construction unit of a memory device according to a tenth embodiment.

FIG. 30 is a diagram illustrating the structure of a packet construction unit of a memory device 5 according to the tenth embodiment. In the tenth embodiment, the structure is similar to that in the ninth embodiment except for a packet construction unit 519*d* and the description of the same structure as that in the ninth embodiment will not be repeated. The packet construction unit 519*d* includes a template register 604 in which the template of UMPIU is set by a CPU 514*b*, a difference register 605 in which difference information is set by the CPU 514*b*, and an ID generating unit 606 which automatically generates a UM ID. For example, the ID generating unit 606 generates UM IDs for a plurality of UMPIUs which are continuously generated, such that the number of the UM IDs are consecutive in order of generation.

Figure 31:
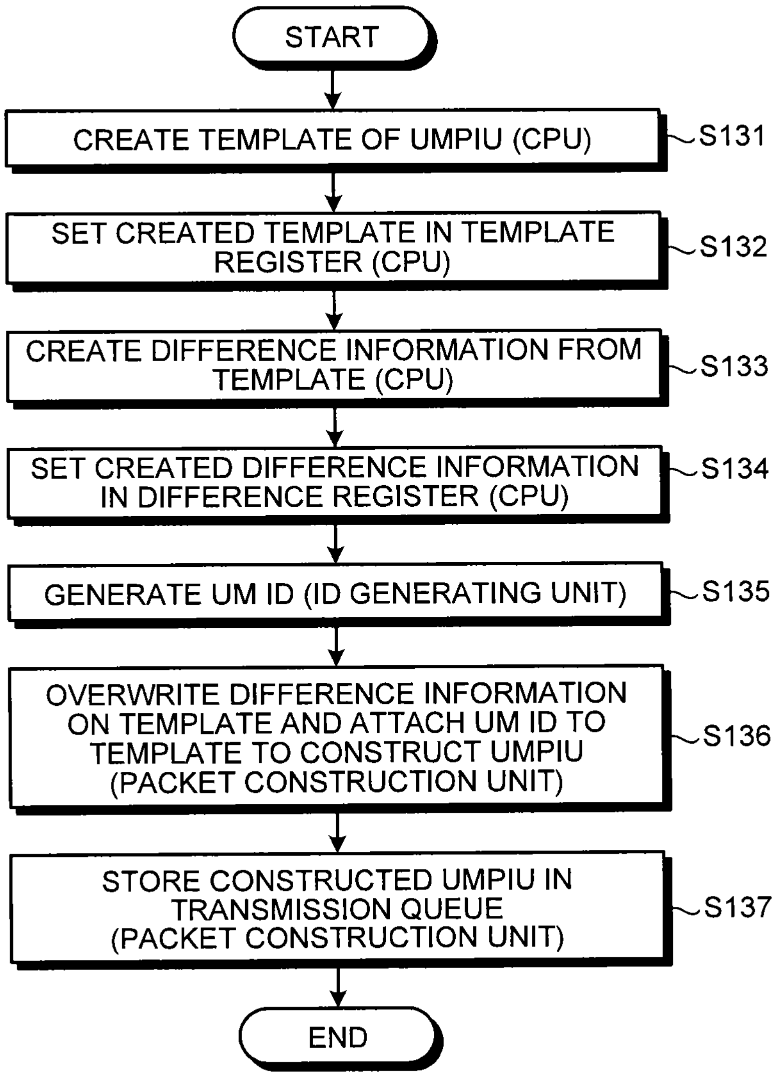
FIG. 31 is a flowchart illustrating the operation of the memory device according to the tenth embodiment.

FIG. 31 is a flowchart illustrating the operation of the memory device 5 according to the tenth embodiment. First, the CPU 514*b* creates the template of UMPIU (Step S131) and sets the created template in the template register 604 (Step S132). Then, the CPU 514*b* creates difference information from the template set in the template register 604 (Step S133) and sets the created difference information in the difference register 605 (Step S134). The packet construction unit 519*d* starts its operation, using the execution of Step S134 as a trigger. Specifically, the ID generating unit 606 generates a UM ID (Step S135). Then, the packet construction unit 519*d* overwrites the difference information set in the difference register 605 on the template set in the template register 604 and attaches the UM ID to the template, thereby constructing UMPIU (Step S136). Then, the packet construction unit 519*d* stores the constructed UMPIU in the transmission queue 512 (Step S137) and ends the operation.

As such, according to the tenth embodiment, the packet construction unit 519*d* includes the ID generating unit 606 which automatically generates a command identifier and attaches the command identifier which is automatically generated by the ID generating unit 606 to the UM access command to be transmitted. In this way, the process of firmware notifying hardware of the command identifier is not needed. Therefore, it is possible to reduce the size of information in hardware which is accessed by firmware and the processing efficiency of firmware is improved. As a result, the access performance of the memory device 5 is improved.

In the fourth embodiment, the memory device is applied to an operation of generating a packet of UPIU. However, the memory device may be applied to an operation of generating a packet of UMPIU.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory device that is connected to a host device, receives a command from the host device, and performs a process based on the command, the memory device comprising:

an interface unit that receives a first command from the outside of the memory device;

a determining unit that determines whether the first command received by the interface unit is an access command that is a write command or a read command;

a second command generating unit that, when the determining unit determines that the first command is the access command, extracts access destination information, which is address information or size information of an access destination, from the first command and generates a second command which includes the extracted access destination information and has a size less than that of the first command; and a processor that executes the second command.

2. The memory device according to claim 1, further comprising:

a reception queue, wherein the determining unit stores the first command in the reception queue when the first command received by the interface unit is not the access command, the second command generating unit stores the generated second command in the reception queue, and the processor acquires and executes the command stored in the reception queue.

3. The memory device according to claim 1, further comprising:

a reception queue, wherein the interface unit stores the received first command in the reception queue, and the determining unit acquires the first command from the reception queue and performs the determination.

4. The memory device according to claim 1, wherein the determining unit and the second command generating unit are mounted as hardware components.

5. The memory device according to claim 1, wherein the first command includes command type information stored in a fixed field and command execution content information stored in a field which is defined for each command type information item, the access destination information is stored in a command execution content information field, the determining unit determines whether the first command is the access command based on the command type information, and the second command generating unit extracts the access destination information from the field corresponding to the command type information.

6. The memory device according to claim 5, wherein the write command or the read command includes a plurality of types of commands which include different fields having the command execution content information stored therein and are identified by the command type information, and the second command generating unit stores the extracted access destination information in the fixed field of the second command.

7. The memory device according to claim 6, wherein the second command includes a first flag indicating whether the command is the first command or the second command, and the processor identifies whether a command to be processed is the first command or the second command based on the first flag.

8. The memory device according to claim 7, wherein the second command includes a third command in which the access destination information is compressed, a fourth command in which the access destination information is not compressed, and a second flag indicating whether the command is the third command or the fourth command, and the processor identifies whether the second command to be processed is the third command or the fourth command based on the second flag.

9. The memory device according to claim 2, further comprising:

a packet construction unit that generates a response packet corresponding to the second command, wherein the first command includes a command identifier for identifying each first command, the second command generating unit extracts the command identifier from the first command and inserts the extracted command identifier into the second command, the processor transmits position information for designating a storage position of the second command corresponding to a response packet to be generated in the reception queue to the packet construction unit, the packet construction unit acquires the command identifier of the second command corresponding to the response packet to be generated, based on the position information, and combines the acquired command identifier with a predetermined fixed value to generate the response packet, and the interface unit transmits the packet generated by the packet construction unit to the outside of the memory device.

10. The memory device according to claim 9, wherein, during each first transmission in which data which has a predetermined size and is requested by the read command is transmitted, the processor determines whether the first transmission to be processed corresponds to second transmission which is the last first transmission in which the execution of the read command is completed, when the processor determines that the first transmission to be processed does not correspond to the second transmission, the packet construction unit generates a first response packet for performing the first transmission to be processed, and when the processor determines that the first transmission to be processed corresponds to the second transmission, the packet construction unit generates the first response packet and automatically generates a second response packet indicating that the execution of the read command has ended.

11. A memory device that is connected to a host device, receives a command output from the host device, and executes the command, the memory device comprising:

an interface unit that receives, from the outside of the memory device, a command including command type information stored in a fixed field and command execution content information stored in a field which is defined for each command type information item;

a reception queue that stores the command received by the interface unit;

an extraction unit that extracts the command type information included in the command; and a processor that acquires the command execution content information from the field corresponding to the extracted command type information in the command which is stored in the reception queue and performs a process corresponding to the command based on the acquired command execution content information.

12. The memory device according to claim 11, further comprising:

a packet construction unit that generates a response packet corresponding to the command which is stored in the reception queue and is executed by the processor, wherein the command includes a command identifier which is stored in a fixed field and identifies each first command, the processor acquires the command identifier from the command stored in the reception queue and notifies the packet construction unit of the acquired command identifier, and the packet construction unit combines the notified command identifier with a predetermined fixed value to generate the response packet.

13. The memory device according to claim 12, wherein the command includes a read command, and during each first transmission in which data which has a predetermined size and is requested by the read command is transmitted, the response packet includes a first response packet for performing the first transmission.

14. The memory device according to claim 12, wherein the response packet includes a second response packet indicating that the execution of the process corresponding to the command is completed.

15. The memory device according to claim 12, wherein the command includes a write command, and the response packet includes a third response packet for notifying that data requested by the write command is ready to be received.

16. A memory device that is connected to a host device including a memory in which a device use area is ensured, receives a command from the host device, and performs a process based on the command, the memory device comprising:

a processor that generates access destination information indicating a read destination in the device use area;

a packet construction unit that generates a read command with a size more than that of the access destination information, based on the access destination information; and an interface unit that outputs the read command generated by the packet construction unit to the outside of the memory device.

17. The memory device according to claim 16, wherein the access destination information includes size designation information for designating one of a plurality of predetermined sizes, and the packet construction unit inserts information designating the size designated by the size designation information into the read command.

18. The memory device according to claim 17, wherein the device use area includes a cache area cashing address translation information, and one of the plurality of predetermined size information items is the same as size information of a cache line forming the cache area.

19. The memory device according to claim 16, wherein the read command includes a command identifier for identifying each command, and the packet construction unit includes a plurality of registers which receive the input of the access destination information from the processor and are associated with different command identifiers in advance and attaches the command identifier corresponding to the register to which the access destination information is input among the plurality of registers to the generated read command.

20. The memory device according to claim 17, wherein the access destination information includes a value obtained by aligning the address information of an access destination in the device use area with one of the plurality of the predetermined sizes.

21. The memory device according to claim 16, wherein the host device executes an access command which includes the read command and is for access to the device use area;

the packet construction unit includes a template storage unit and a register which receives input from the processor, the processor sets a template in the template storage unit in advance and writes, to the register, difference information between the template set in the template storage unit and the access command to be transmitted, and the packet construction unit generates the access command to be transmitted, based on the template set in the template storage unit and the difference information written to the register.

22. The memory device according to claim 16, wherein the access command includes a command identifier for identifying each command, and the packet construction unit further includes a command identifier generating unit that generates the command identifier and attaches the command identifier generated by the command identifier generating unit to the access command to be transmitted.

23. A memory device that is connected to a host device including a memory in which a device use area is ensured, receives a command from the host device, and performs a process based on the command, the memory device comprising:

an access command generating unit that generates an access command which is for access to the device use area;

an interface unit that outputs the access command generated by the access command generating unit to the outside of the memory device and receives a packet including acknowledgement corresponding to the access command from the outside of the memory device;

a determining unit that determines the packet received by the interface unit is normal acknowledgement indicating normal ending or abnormal acknowledgement indicating abnormal ending, stores the abnormal acknowledgement in a reception queue when the packet is the abnormal acknowledgement, and does not store the normal acknowledgement in the reception queue when the packet is the normal acknowledgement; and a processor that acquires the abnormal acknowledgement from the reception queue.

24. The memory device according to claim 23, further comprising:

a register that can be read by the processor, wherein, when the packet is the normal acknowledgement, the determining unit records a command identifier for identifying the normal acknowledgement in the register.

* * * * *